United States Patent
Chencinski et al.

(10) Patent No.: US 12,389,188 B2
(45) Date of Patent: Aug. 12, 2025

(54) MOTION TRACKING CALIBRATION FOR WEARABLE DEVICE

(71) Applicant: Microsoft Technology Licensing, LLC, Redmond, WA (US)

(72) Inventors: Eran Chencinski, Giv'at Shmuel (IL); Daniel Spivak, Ness Ziona (IL); Shoham Dekel, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 181 days.

(21) Appl. No.: 18/161,687

(22) Filed: Jan. 30, 2023

(65) Prior Publication Data

US 2024/0259754 A1  Aug. 1, 2024

(51) Int. Cl.
*H04S 7/00* (2006.01)

(52) U.S. Cl.
CPC .................... *H04S 7/304* (2013.01)

(58) Field of Classification Search
CPC .......... H04S 7/034; H04S 7/304; H04S 3/008; H04S 3/004; H04R 5/033
See application file for complete search history.

(56) References Cited

U.S. PATENT DOCUMENTS

| | | | |
|---|---|---|---|
| 9,652,031 B1 | 5/2017 | Savastinuk et al. | |
| 11,409,360 B1 | 8/2022 | Brimijoin et al. | |
| 2008/0112567 A1 | 5/2008 | Siegel et al. | |
| 2012/0229385 A1 | 9/2012 | Fu | |
| 2013/0006473 A1 | 1/2013 | Brunner | |
| 2013/0006573 A1 | 1/2013 | Brunner | |
| 2016/0161240 A1 | 6/2016 | Starner et al. | |
| 2017/0124362 A1 | 5/2017 | Sheng et al. | |
| 2019/0155364 A1 | 5/2019 | Chen | |
| 2019/0171806 A1 | 6/2019 | Embrechts et al. | |
| 2019/0278900 A1 | 9/2019 | Yang et al. | |
| 2019/0394649 A1 | 12/2019 | Ledvina et al. | |
| 2020/0049504 A1 | 2/2020 | Rizzardini | |
| 2020/0396614 A1 | 12/2020 | Maragoudakis | |
| 2021/0044913 A1 | 2/2021 | Häussler | |
| 2021/0067896 A1 | 3/2021 | Anagnos | |
| 2021/0397248 A1 | 12/2021 | Landemaine | |
| 2021/0400418 A1 | 12/2021 | Tam et al. | |

(Continued)

OTHER PUBLICATIONS

"How to Unlock your iPhone with your Apple Watch—Apple Support", Retrieved From: https://www.youtube.com/watch?v=vxK_oY13qYU, Apr. 27, 2021, 3 Pages.

(Continued)

*Primary Examiner* — Rasha S Al Aubaidi
(74) *Attorney, Agent, or Firm* — Alleman Hall & Tuttle LLP

(57) ABSTRACT

A wearable device is provided, including an accelerometer, a gyroscope, and a processing device. The processing device is configured to receive acceleration data from the accelerometer, receive orientation data from the gyroscope, and receive simulated magnetometer data from an offboard computing device. Based at least in part on the acceleration data, the orientation data, and the simulated magnetometer data, the processing device is further configured to perform motion tracking calibration to obtain an estimated position and orientation of the wearable device relative to the offboard computing device. The processing device is further configured to output the estimated position and orientation to an additional computing process.

25 Claims, 20 Drawing Sheets

(56) References Cited

U.S. PATENT DOCUMENTS

2022/0038808 A1    2/2022    Burgess et al.
2022/0225050 A1    7/2022    Ninan et al.

OTHER PUBLICATIONS

"Unlock your Mac with an Apple Watch", Retrieved From: https://www.youtube.com/watch?v=jFh4WSALAWQ, Feb. 9, 2019, 5 Pages.
Burgess, Brian, "How to Use Dynamic Lock on Windows 11", Retrieved From: https://www.groovypost.com/howto/use-dynamic-lock-on-windows-11/#:~:text=Dynamic%20Lock%20uses%20any%20connected,will%20lock%20the%20screen%20automatically, Apr. 25, 2022, 21 Pages.
Trivedi, Yatri, "How to (Un)Lock Your PC by Being Nearby (With a Bluetooth Phone)", Retrieved From: https://www.howtogeek.com/67556/how-to-unlock-your-pc-by-being-nearby-with-a-bluetooth-phone/, Sep. 27, 2015, 7 Pages.
International Search Report and Written Opinion received for PCT Application No. PCT/US2024/010232, Apr. 2, 2024, 21 pages.

MOTION TRACKING CALIBRATION FOR WEARABLE DEVICE

BACKGROUND

Spatial audio is a type of audio output in which the spatial location and/or orientation of the user affects how an audio output is generated. Spatial data for a user may be used to produce an audio output that sounds as though it is localized at a particular location in the user's environment other than the location of a speaker producing the audio output. In some examples, the spatial audio output may be generated so as to sound as though its source is moving through the user's surroundings. Spatial audio outputs may be generated at wearable audio devices (e.g., headphones or earbuds) or at other types of audio devices.

SUMMARY

According to one aspect of the present disclosure, a wearable device is provided, including an accelerometer, a gyroscope, and a processing device. The processing device is configured to receive acceleration data from the accelerometer, receive orientation data from the gyroscope, and receive simulated magnetometer data from an offboard computing device. Based at least in part on the acceleration data, the orientation data, and the simulated magnetometer data, the processing device is further configured to perform motion tracking calibration to obtain an estimated position and orientation of the wearable device relative to the offboard computing device. The processing device is further configured to output the estimated position and orientation to an additional computing process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In order to accurately produce spatial audio outputs that are perceived as having sources located at intended locations, devices that are used to generate spatial audio may track the spatial location and orientation of the user. This tracking may be performed using sensors located in a wearable audio device. For example, an accelerometer and a gyroscope included in a wearable audio device may be used to provide position and orientation data for a user wearing the device. The position and orientation data may then be used as inputs to a spatial audio generating module at which the position and orientation of the user are used to set parameters of an audio output such that the audio output sounds as though it originates from an intended location.

In other types of computing devices, magnetometers are frequently used when tracking the position and orientation of the device. A magnetometer may use the direction of the Earth's magnetic field to determine a spatial orientation of the computing device. However, the speakers used in wearable audio devices include magnets that are subjected to induced magnetic fields to produce sound by causing the magnets to vibrate. These magnets, as well as the magnetic fields used to produce vibrations, may produce inaccuracies in magnetometer readouts. Accordingly, wearable audio devices do not typically include magnetometers.

The positions and orientations of wearable audio devices may be more difficult to accurately estimate than the positions and orientations of other types of computing devices due to the typical lack of magnetic field data. In particular, estimates of the device orientation in the yaw direction (the direction of rotation in a horizontal plane) may be difficult to measure accurately without a magnetometer. Horizontal drift, in which the sensors of the wearable audio device detect an inaccurate angular velocity in the yaw direction, frequently occurs for wearable audio devices. As one previous solution to the problem of horizontal drift, the angular velocity of the wearable audio device may be calibrated in the yaw direction when the wearable audio device is manufactured. However, due to hardware aging, changes in temperatures, and other post-manufacturing changes to the wearable audio device, calibration drift may occur.

Figure 1:
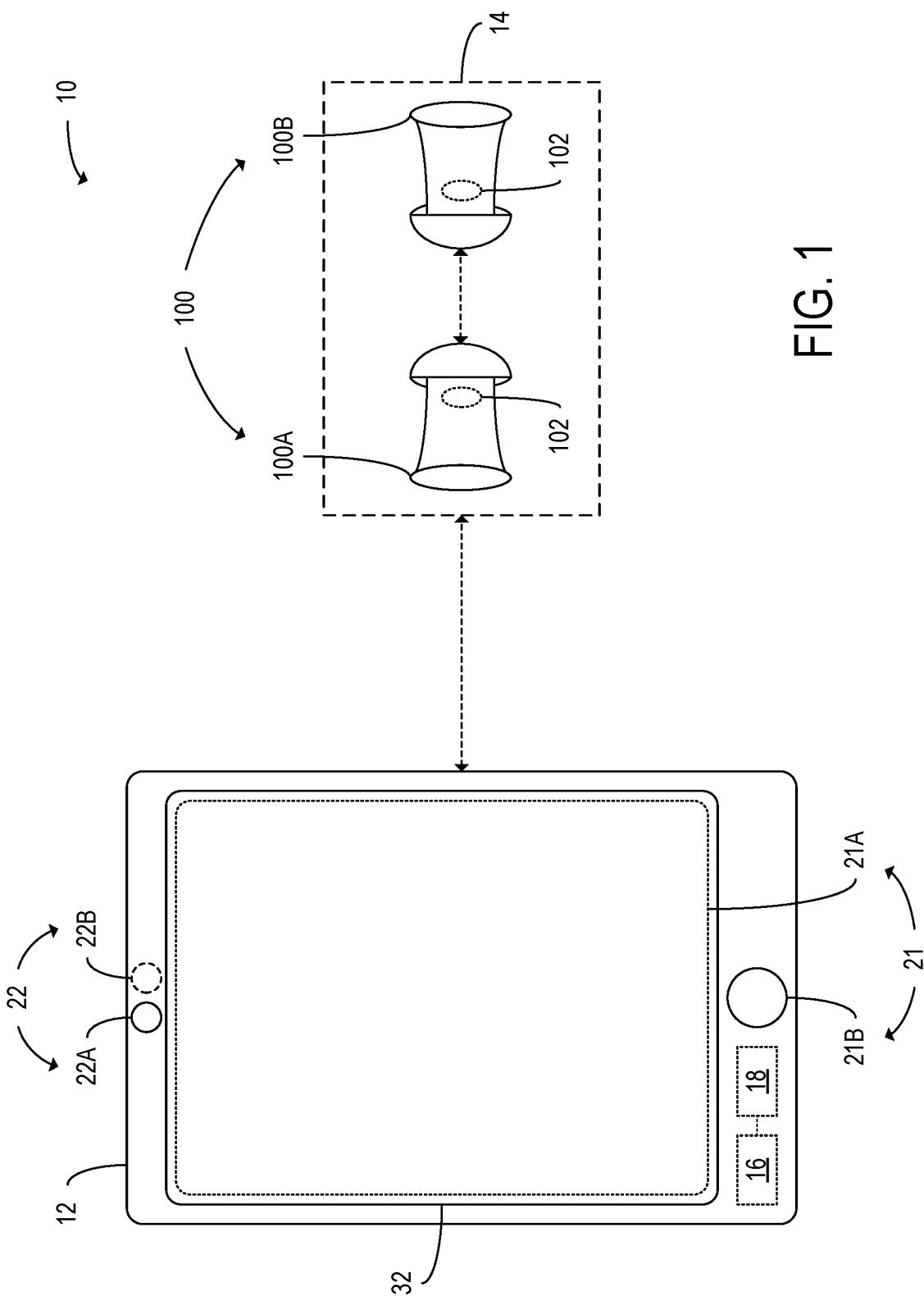
FIG. 1 schematically shows a computing system that includes a wearable device and an offboard computing device, according to one example embodiment.

Using the devices and methods discussed below, motion tracking calibration is performed for a wearable audio device. Thus, the problems discussed above may be addressed. FIG. 1 schematically shows a computing system 10 that includes a wearable device 14 and an offboard computing device 12. The wearable device 14 may, as shown in the example of FIG. 1, be a wearable audio device that includes one or more speakers 102. In the example of FIG. 1, the wearable device 14 is an earbud system that includes a plurality of earbuds 100, including a left earbud 100A and a right earbud 100B. In other examples, the wearable device 14 may be a pair of headphones or some other wearable audio device. The earbuds 100 included in the wearable device 14 are configured to wirelessly communicate with each other and with the offboard computing device 12.

In the example of FIG. 1, the offboard computing device 12 is shown as a tablet computing device. The offboard computing device 12 includes one or more processing devices 16 and one or more memory devices 18 that are communicatively coupled to execute computing processes. In addition, the offboard computing device 12 shown in the example of FIG. 1 includes a display 32. The example offboard computing device 12 further includes a plurality of touch sensors 21, including a first touch sensor 21A that overlaps the display 32 and a second touch sensor 21B that is provided apart from the display 32. The offboard computing device 12 shown in FIG. 1 further includes imaging sensors 22, including an inward-facing imaging sensor 22A and an outward-facing imaging sensor 22B. The imaging sensors 22 may, for example, be cameras or ultra-wideband (UWB) sensors.

Figure 2:
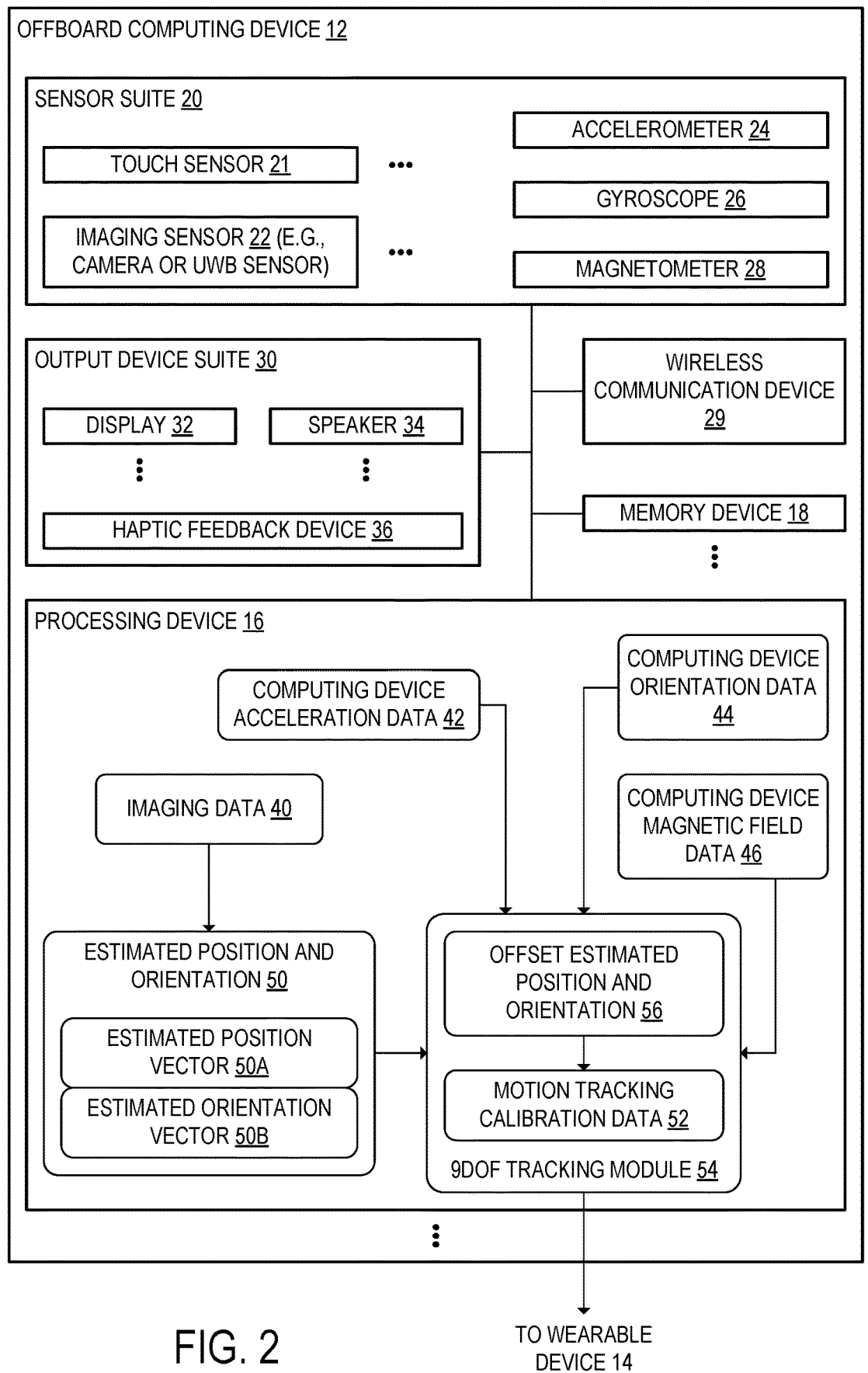
FIG. 2 schematically shows the offboard computing device when motion tracking calibration data is computed, according to the example of FIG. 1.

FIG. 2 schematically shows the offboard computing device 12 in additional detail. As depicted in the example of FIG. 2, the offboard computing device 12 includes a sensor suite 20. The sensor suite includes the one or more touch sensors 21 and the one or more imaging sensors 22. In addition, the sensor suite 20 shown in the example of FIG. 2 includes an accelerometer 24, a gyroscope 26, and a magnetometer 28. The accelerometer 24 is configured to measure computing device acceleration data 42 that indicates linear acceleration of the offboard computing device 12. The gyroscope 26 is configured to measure computing device orientation data 44 that indicates an angular orientation of the offboard computing device 12 with respect to the direction of gravity. The orientation data 44 further indicates an angular velocity of the offboard computing device 12. The magnetometer 28 is configured to measure computing device magnetic field data 46 that indicates the strength and direction of a magnetic field to which the offboard computing device 12 is subjected. Since the main source of magnetic fields at the offboard computing device 12 is typically the Earth's magnetic field, the computing device magnetic field data 46 may indicate an orientation of the offboard computing device 12 relative to the Earth's magnetic field.

As shown in the example of FIG. 2, the offboard computing device 12 further includes a wireless communication device 29 that is configured to transmit data to and receive data from the one or more processing devices 16. Via the wireless communication device 29, the offboard computing device 12 is configured to communicate with one or more other computing devices, including the wearable device 14.

Figure 3A:
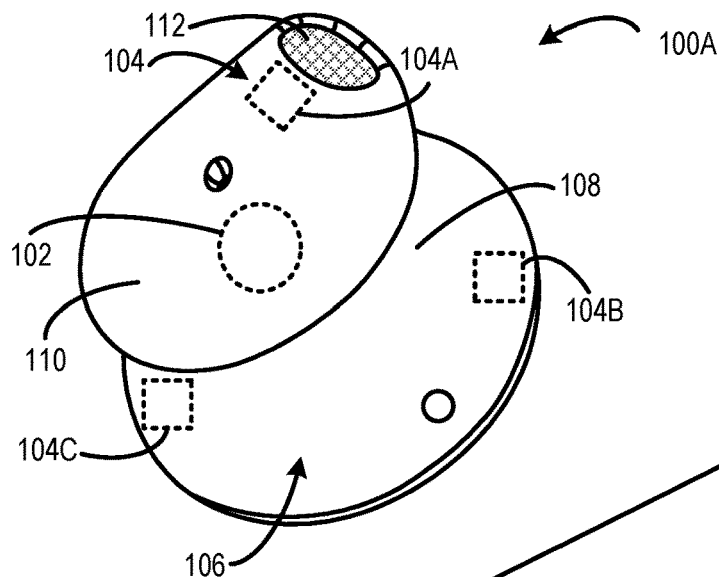
FIGS. 3A-3C respectively show three views of an example left earbud included in the wearable device, according to the example of FIG. 1.
Figure 3B:
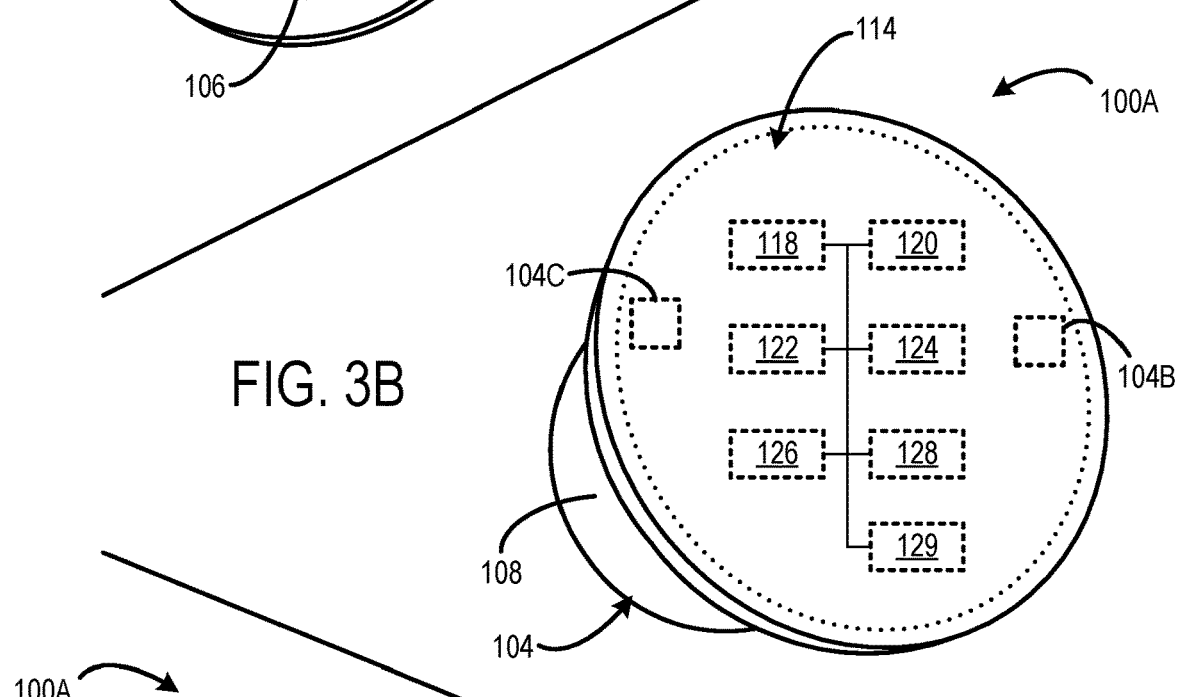
Figure 3C:
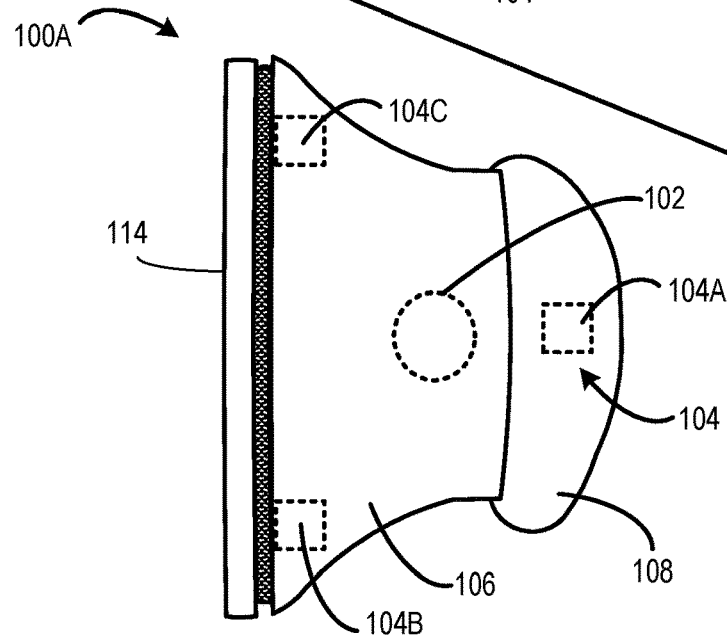

FIGS. 3A-3C respectively show three views of an example left earbud 100A that may be included in the wearable device 14. The right earbud 100B included in the wearable device 14 as shown in the example of FIG. 1 may have an at least partially mirrored structure compared to the left earbud 100A of FIGS. 3A-3C, such that the left earbud 100A is configured to be worn in a user's left ear and the right earbud 100B is configured to be worn in the user's right ear.

The left earbud 100A shown in FIGS. 3A-3C includes a speaker 102 configured to emit sound into the user's left ear. The left earbud 100A further includes a microphone array 104 configured to capture sound emitted from the user's mouth and the surrounding environment. The microphone array 104 includes a plurality of microphones 104A, 104B, 104C. In other examples, the microphone array 104 may include some other number of microphones.

The left earbud 100A of FIGS. 3A-3C includes a housing 106. The housing 106 may be formed from any suitable materials including, but not limited to, plastic, metal, ceramic, glass, crystalline materials, composite materials, or other suitable materials. As shown in FIGS. 3A-3C, the housing 106 includes a neck 108 and a bud 110. The neck 108 is sized and shaped to position the bud 110 against the concha, a hollow depression in the user's ear, when the left earbud 100A is placed in the user's ear. The bud 110 includes a speaker port 112. The bud 110 is sized and shaped to align the speaker port 112 to direct sound emitted from the speaker 102 into the user's ear canal when the left earbud 100A is worn in the user's ear.

In the example of FIGS. 3A-3C, the microphone array 104 includes an in-ear microphone 104A, a first voice microphone 104B, and a second voice microphone 104C. The in-ear microphone 104A is positioned proximate to the speaker port 112 in the bud 110. The first voice microphone 104B and the second voice microphone 104C are positioned at the base of the neck 108. In this example, the in-ear microphone 104A is configured to capture primarily sound in the user's ear, the first voice microphone 104B is configured to capture primarily sound emitted from the user's mouth, and the second voice microphone 104C is configured to capture primarily background noise outside of the earbud 100.

The view of the left earbud 100A shown in FIG. 3B schematically shows components of the left earbud 100A at which computing processes are configured to be performed. The earbuds 100 each include respective memory devices 118 and a respective processing device 120. The memory device 118 and the processing device 120 are also communicatively coupled to a plurality of sensors that, in the example of FIGS. 3A-3B, include an accelerometer 122, a gyroscope 124, a temperature sensor 126, and a proximity sensor 128. The earbuds 100 further include respective wireless communication devices 129 that are configured to receive data from and transmit data to their respective processing devices 120. The wireless communication devices 129 allow the processing devices 120 of the earbuds 100 to communicate with other computing devices, including the offboard computing device 12.

Figure 4:
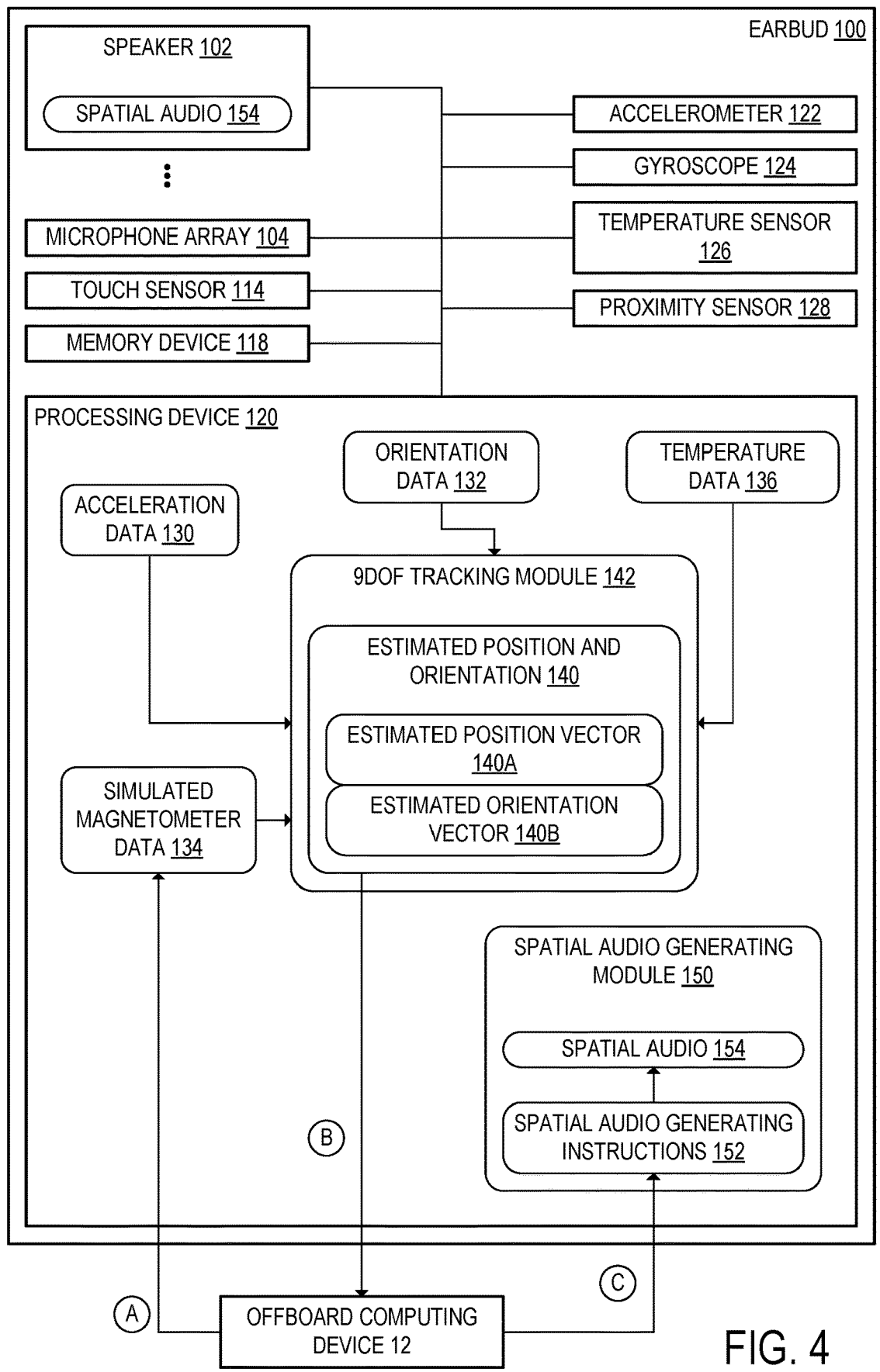
FIG. 4 schematically shows an earbud included in the wearable device when an estimated position and orientation are computed, according to the example of FIG. 1.

FIG. 4 schematically shows the components of an earbud 100 in additional detail. In the example of FIG. 4, the processing device 120 of the earbud 100 is configured to receive acceleration data 130 from the accelerometer 122 and to receive orientation data 132 from the gyroscope 124. The orientation data 132 indicates an angular orientation and angular velocity of the earbud 100. The processing device 120 is configured to input the acceleration data 130 and the orientation data 132 into a nine-degree-of-freedom (9DOF) tracking module 142. As discussed in further detail below, simulated magnetometer data 134 is also input into the 9DOF tracking module 142. The processing device 120 is further configured to receive temperature data 136 from the temperature sensor 126 in some examples, as shown in FIG. 4.

In addition to the data received from onboard sensors included in the earbud 100, the processing device 120 is further configured to receive simulated magnetometer data 134 from the offboard computing device 12. The simulated magnetometer data 134 indicates an angle at which the earbud 100 is oriented relative to the Earth's magnetic field or the magnetic force exerted by the Earth's magnetic field. Thus, the simulated magnetometer data 134 acts as a substitute for magnetometer data that would be collected at the earbud 100 if the earbud 100 included a magnetometer.

Based at least in part on the acceleration data 130, the orientation data 132, and the simulated magnetometer data 134, the processing device 120 of the earbud 100 is further configured to perform motion tracking calibration to obtain an estimated position and orientation 140 of the wearable device 14 relative to the offboard computing device 12. In the example of FIG. 4, the processing device 120 is configured to perform 9DOF position tracking at the 9DOF tracking module 142 using the acceleration data 130, the orientation data 132, and the simulated magnetometer data 134 to compute the estimated position and orientation 140. Thus, the processing device 120 is configured to perform sensor fusion of the acceleration data 130, the orientation data 132, and the simulated magnetometer data 134. Incorporating the simulated magnetometer data 134 into the estimation of the position and orientation of the wearable device 14 allows the processing device 120 to perform 9DOF tracking instead of 6DOF tracking, thereby resulting in higher accuracy for the estimated position and orientation 140. The nine degrees of freedom used at the 9DOF tracking module 142 in the example of FIG. 4 are respective components of the acceleration data 130, the orientation data 132, and the simulated magnetometer data 134, which are expressed as vectors in three spatial dimensions. In some examples, the estimated position and orientation 140 may be expressed as an estimated position vector 140A and an estimated orientation vector 140B.

Figure 5:
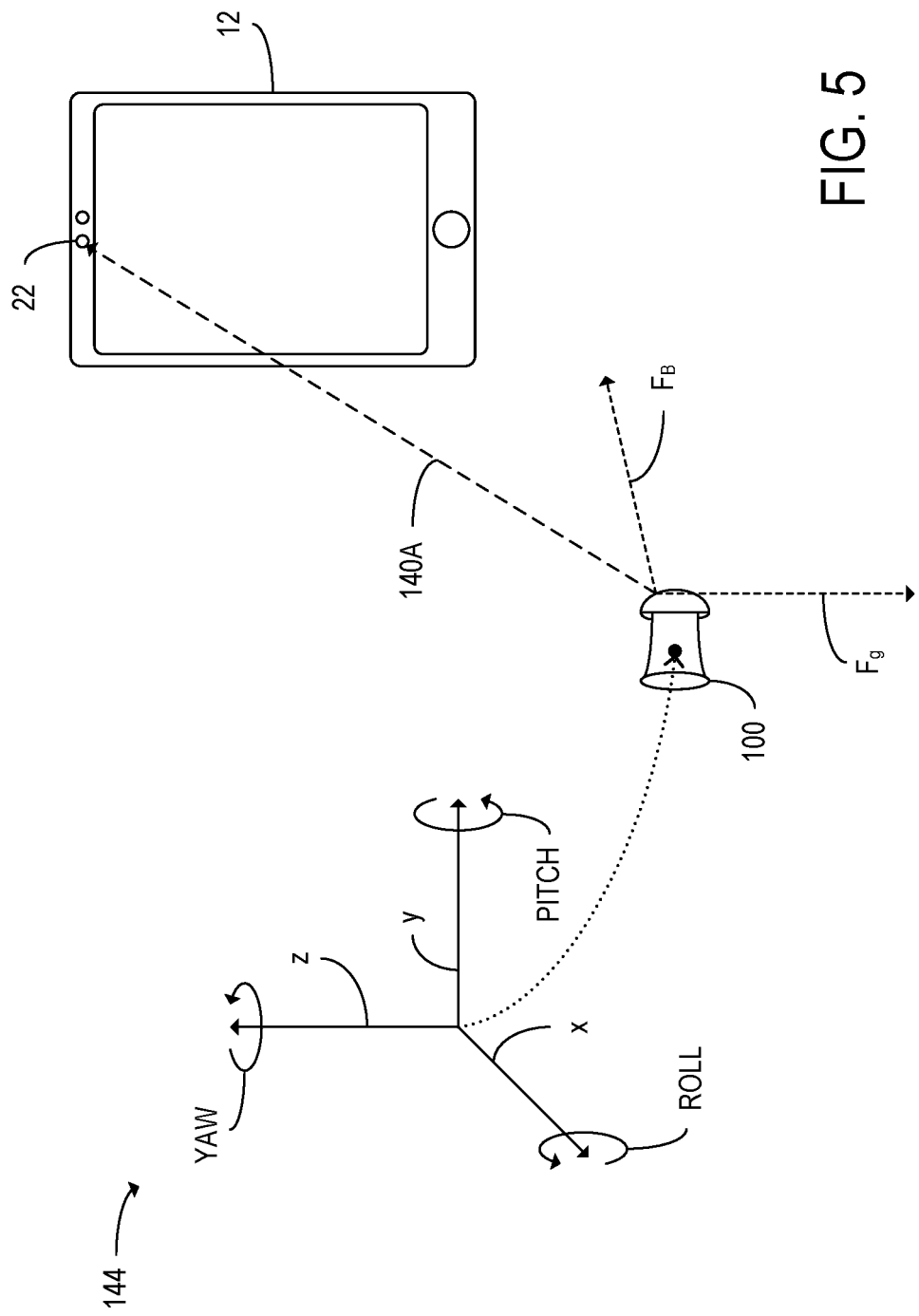
FIG. 5 schematically shows a coordinate system of the earbud, according to the example of FIG. 4.

FIG. 5 schematically shows a coordinate system 148 of the earbud 100. The coordinate system 148 includes positional coordinates indicated as x, y, and z, as well as rotational coordinates indicated as roll, pitch, and yaw. In addition, FIG. 5 shows the estimated position vector 140A of the earbud 100 relative to the imaging sensor 22 of the offboard computing device 12. Vectors indicating the directions of the gravitational force $F_g$ and the magnetic force FB on the earbud 100 are also depicted in the example of FIG. 5.

Figure 6A:
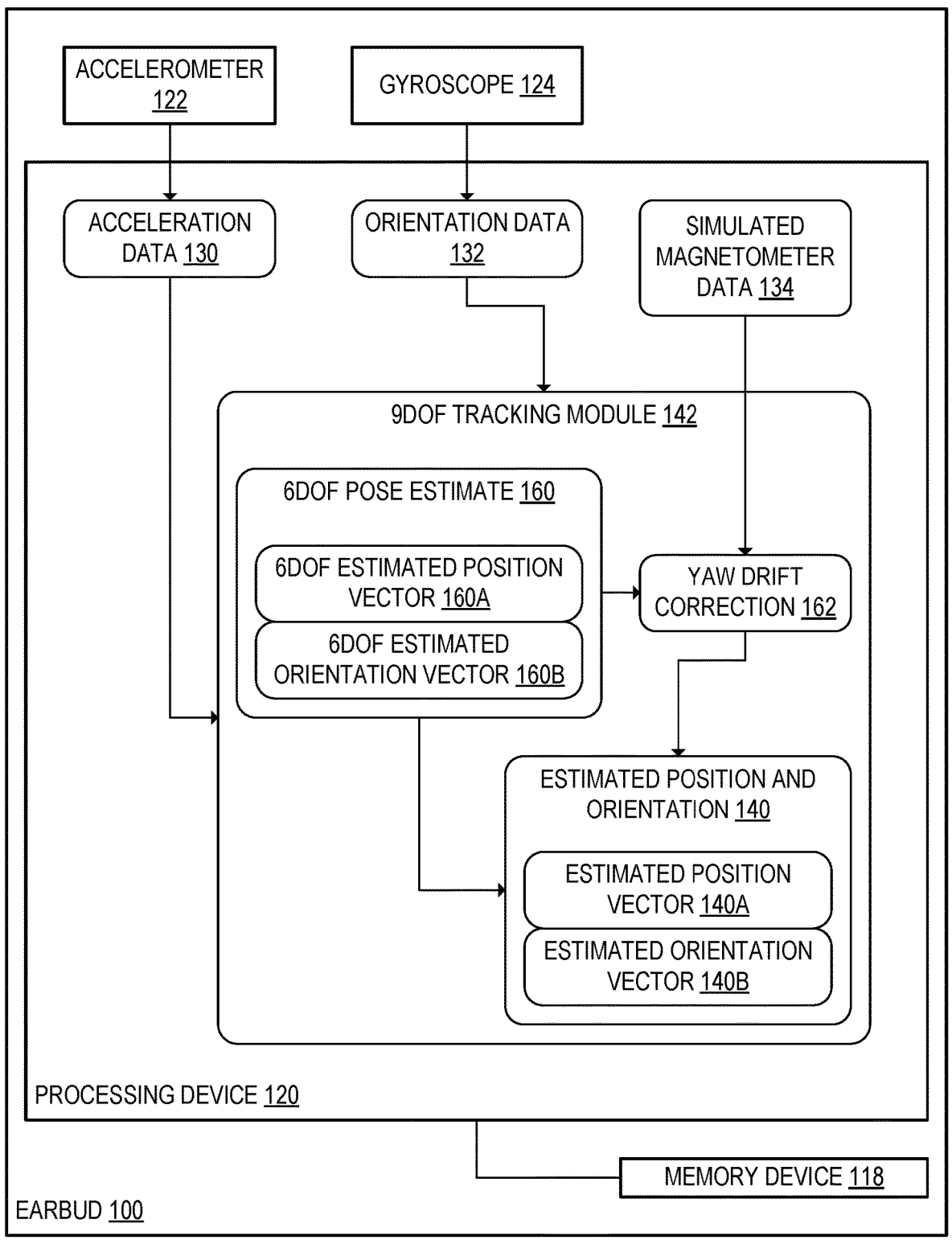
FIG. 6A schematically shows the earbud of FIG. 4 when a nine-degree-of-freedom (9DOF) tracking module is executed.
Figure 6B:
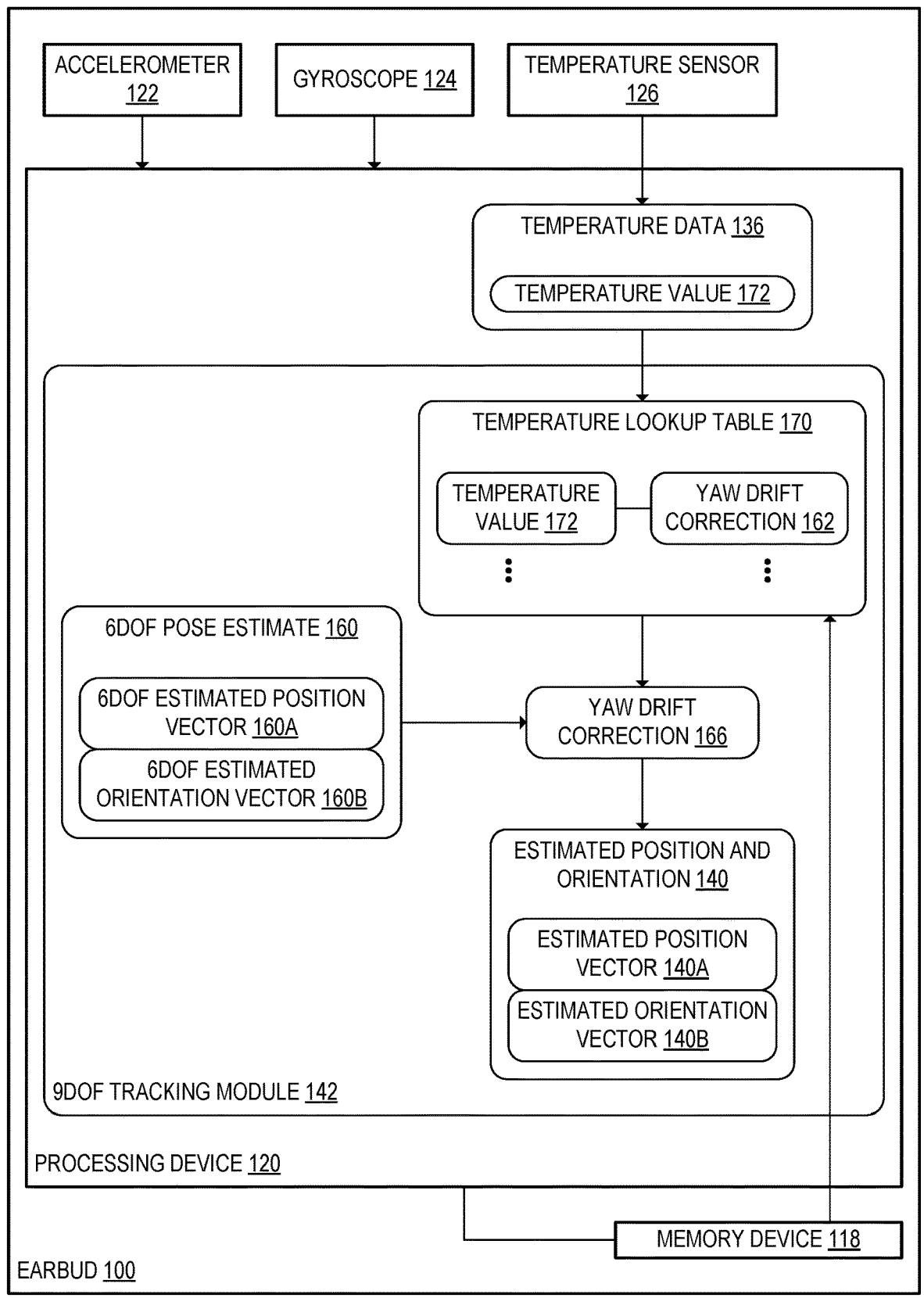
FIG. 6B schematically shows the earbud when the 9DOF tracking module receives temperature data from a temperature sensor, according to the example of FIG. 6A.

FIGS. 6A-6B schematically show the processing device 120 of the earbud 100 in additional detail when the 9DOF tracking module 142 is executed. In the example of FIG. 6A, at the 9DOF tracking module 142, the processing device 120 is configured to perform six-degree-of-freedom (6DOF) tracking using the acceleration data 130 received from the accelerometer 122 and the orientation data 132 received from the gyroscope 124. Thus, the processing device 120 is configured to compute a 6DOF pose estimate 160, which may include a 6DOF estimated position vector 160A and a 6DOF estimated orientation vector 160B.

As discussed above, since the earbud 100 does not include a magnetometer, the 6DOF pose estimate 160 may be inaccurate due to calibration drift in the yaw direction. Accordingly, at the 9DOF tracking module 142, the processing device 120 is further configured to compute a yaw drift correction 162 based at least in part on the simulated magnetometer data 134, the acceleration data 130, and the orientation data 132. The yaw drift correction 162 may be expressed as an angular velocity in the yaw direction. When the processing device 120 utilizes the acceleration data 130 and the orientation data 132 during computation of the yaw drift correction 162, the processing device 120 may be configured to compute the yaw drift correction 162 based at least in part on the 6DOF pose estimate 160. In such examples, the processing device 120 may be configured to compare a yaw value indicated in the simulated magnetometer data 134 to a yaw value included in the 6DOF pose estimate 160 to determine a yaw drift. Alternatively, the processing device 120 may utilize the acceleration data 130 and the orientation data 132 without pre-processing them into a 6DOF pose estimate 160. When the yaw drift correction 162 is computed, the simulated magnetometer data 134, the acceleration data 130, and the orientation data 132 may be input into a 9DOF tracking algorithm such as a Kalman filtering algorithm or a complementary filtering algorithm. By performing the 9DOF tracking algorithm, the processing device 120 is further configured to compute the estimated position and orientation 140 based at least in part on the yaw drift correction 162. Thus, the processing device 120 is configured to perform motion tracking calibration for the earbud 100 in a manner that results in more accurate yaw values for the wearable device 14.

In some examples, as shown in FIG. 6B, the processing device 120 is further configured to receive a temperature value 172 from the temperature sensor 126 at the 9DOF tracking module 142. The temperature value 172 is included in the temperature data 136. In some examples, a sample of a plurality of temperature values 172 included in the temperature data 136 may be received at the 9DOF tracking module 142. In such examples, the processing device 120 is further configured to compute the yaw drift correction 162 based at least in part on the temperature value 172. In some examples, the memory device 118 stores a temperature lookup table 170 mapping a plurality of temperature values 172 to a respective plurality of yaw drift corrections 162. The temperature lookup table 170 may accordingly indicate a dependence between temperature and yaw drift. By retrieving the yaw drift correction 162 associated with a detected temperature value 172 from the temperature lookup table 170, the processing device 120 is configured to adjust the estimated position and orientation 140 for the effects of temperature on yaw drift, thereby resulting in more accurate 9DOF tracking.

The processing device 120 may be configured to retrieve the yaw drift correction 162 from the temperature lookup table 170 even when simulated magnetometer data 134 is not received from the offboard computing device 12. Thus, the processing device 120 may continue to correct for yaw drift when the earbud 100 is not receiving the simulated magnetometer data 134. The values of the yaw drift correction 162 may be used, for example, when the offboard computing device 12 is unable to obtain accurate values of quantities with which the simulated magnetometer data 134 is computed.

Figure 6C:
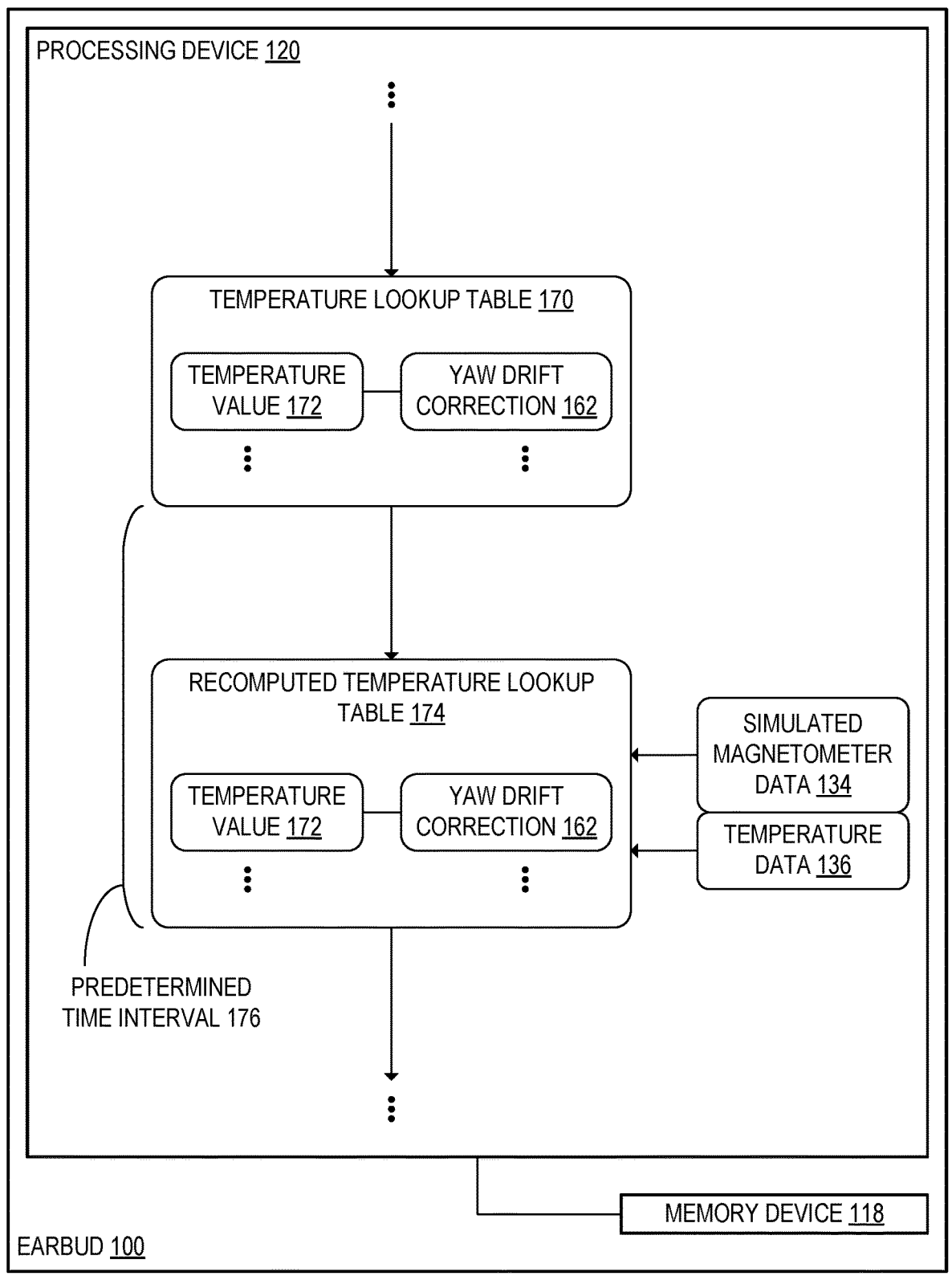
FIG. 6C schematically shows the earbud of FIG. 6B when a temperature lookup table is at least partially recomputed.

In some examples in which the memory device 118 stores a temperature lookup table 170, as schematically depicted in the example of FIG. 6C, the processing device 120 is further configured to at least partially recompute the temperature lookup table 170 at a predetermined time interval 176. The temperature lookup table 170 is recomputed using calibration data received at least in part from the offboard computing device 12. In the example of FIG. 6C, the processing device 120 generates a recomputed temperature lookup table 174 using calibration data that includes the simulated magnetometer data 134 and the temperature data 136. In some examples, values of the yaw drift correction 162 may be maintained from the previous iteration of the temperature lookup table 170 for temperature values 172 not included in the temperature data 136 received during the predetermined time interval 176. In other examples, such values of the yaw drift correction 162 may be adjusted via interpolation between updated values of the yaw drift correction 162. By iteratively recomputing the temperature lookup table 170, the processing device 120 may account for changes in the yaw drift due to device aging.

Figure 7A:
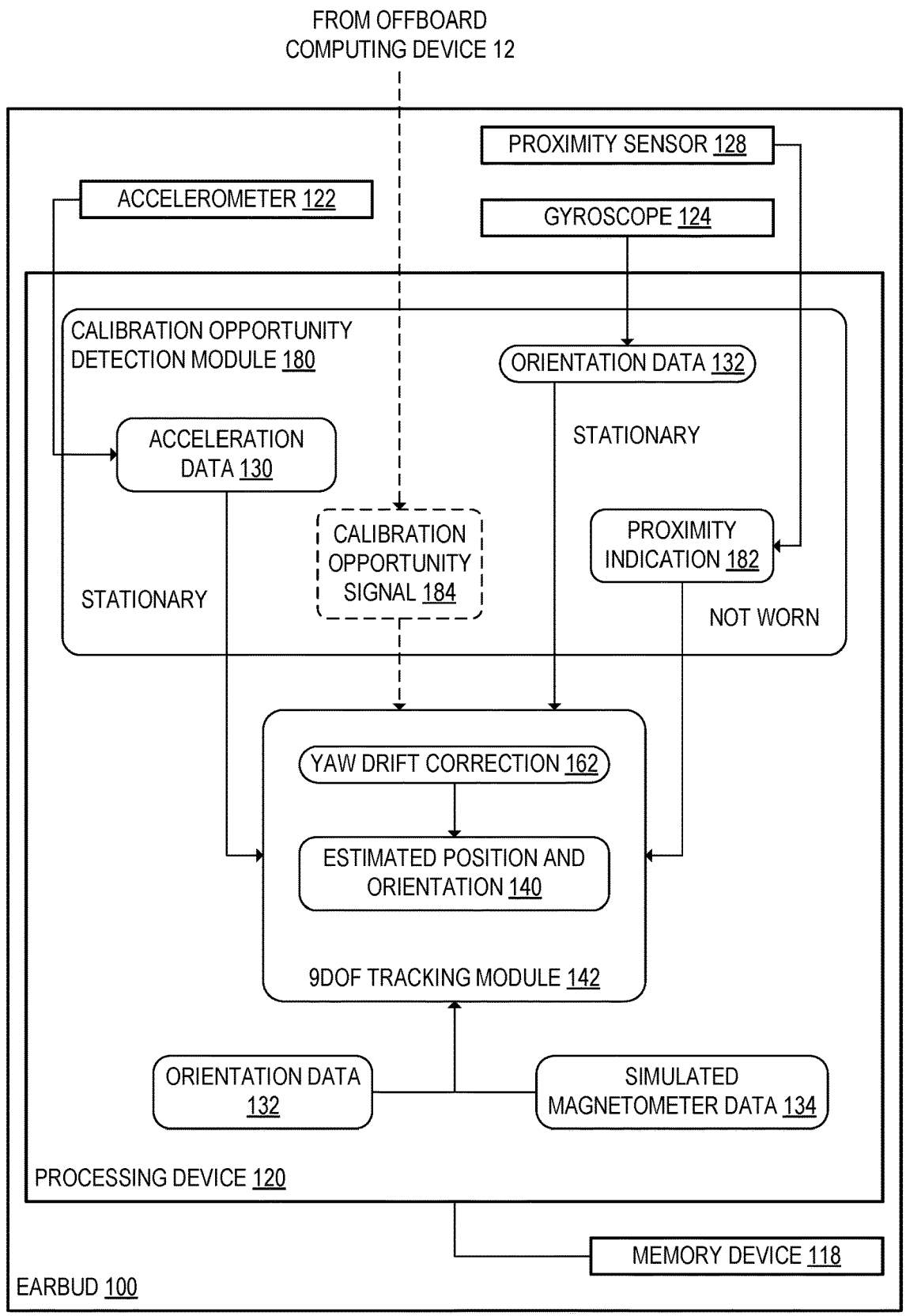
FIG. 7A schematically shows the earbud of FIG. 4 when a calibration opportunity detection module is executed.

FIG. 7A schematically shows the earbud 100 when the processing device 120 is configured to execute a calibration opportunity detection module 180. At the calibration opportunity detection module 180, the processing device 120 is configured to identify a time at which accurate motion tracking calibration may be performed. The calibration opportunity detection module 180 may utilize acceleration data 130 received from the accelerometer 122 and a proximity indication 182 received from the proximity sensor 128. In some examples, the calibration opportunity detection module 180 is further configured to receive orientation data 132 from the gyroscope 124.

The proximity sensor 128 is configured to detect objects adjacent to the earbud 100, and may, for example, be an infrared sensor. Using the proximity indication 182 received from the proximity sensor 128, the processing device 120 is configured to detect whether the earbud 100 is worn by a user.

The calibration opportunity detection module 180, according to the example of FIG. 7A, is configured to use the acceleration data 130 and the proximity indication 182 to identify a time at which the position and orientation of the earbud 100 are likely to remain constant during motion tracking calibration. Via the proximity sensor 128, the processing device 120 is configured to receive a proximity indication 182 indicating that the wearable device 14 is not worn by a user. In addition, via the accelerometer 122, the processing device 120 is configured to receive acceleration data 130 indicating that the wearable device 14 is stationary. In some examples, the processing device 120 is further configured to receive orientation data 132 from the gyroscope 124 indicating that the wearable device 14 is stationary in its angular orientation.

The processing device 120 is further configured to perform the motion tracking calibration in response to receiving the indications that the wearable device 14 is stationary and not worn by the user. Accordingly, the calibration opportunity detection module 180 is configured to instruct the 9DOF tracking module 142 to perform the motion tracking calibration (e.g., by computing the yaw drift correction 162). The processing device 120 may therefore perform the motion tracking calibration under conditions in which the angular velocity of the wearable device 14 in the yaw direction is expected to be zero. By performing the motion tracking calibration when the angular velocity in the yaw direction is expected to be zero, the processing device 120 may determine a baseline value of the yaw drift and use that baseline value to compute the yaw drift correction 162, thereby resulting in more accurate calibration.

In some examples, additionally or alternatively to detecting a calibration opportunity based on acceleration data 130 and a proximity indication 182, the processing device 120 may be further configured to receive a calibration opportunity signal 184 from the offboard computing device via a wireless connection. In such examples, the calibration opportunity signal 184 instructs the processing device 120 to perform the motion tracking calibration at the 9DOF tracking module 142. Calibration opportunity detection may therefore be at least partially offloaded to the offboard computing device 12, such that the greater processing capabilities of the offboard computing device 12 are used to identify conditions that are likely to result in accurate calibration. Additionally or alternatively, sensor data collected at both the offboard computing device 12 and the wearable device 14 may be used to identify the calibration opportunity. For example, the offboard computing device 12 may be configured to transmit the calibration opportunity signal 184 to the wearable device 14 in response to the one or more processing devices 16 of the offboard computing device 12 determining, based at least in part on computing device acceleration data 42 and computing device orientation data 44 detected by the accelerometer 24 and the gyroscope 26 of the offboard computing device 12, that the offboard computing device 12 is stationary. The calibration opportunity detection module 180 may be configured to perform the motion tracking calibration in such examples in response to determining that both the offboard computing device 12 and the wearable device 14 are stationary. Thus, the processing device 120 may avoid calibration errors associated with correcting for movement of the offboard computing device 12.

Figure 7B:
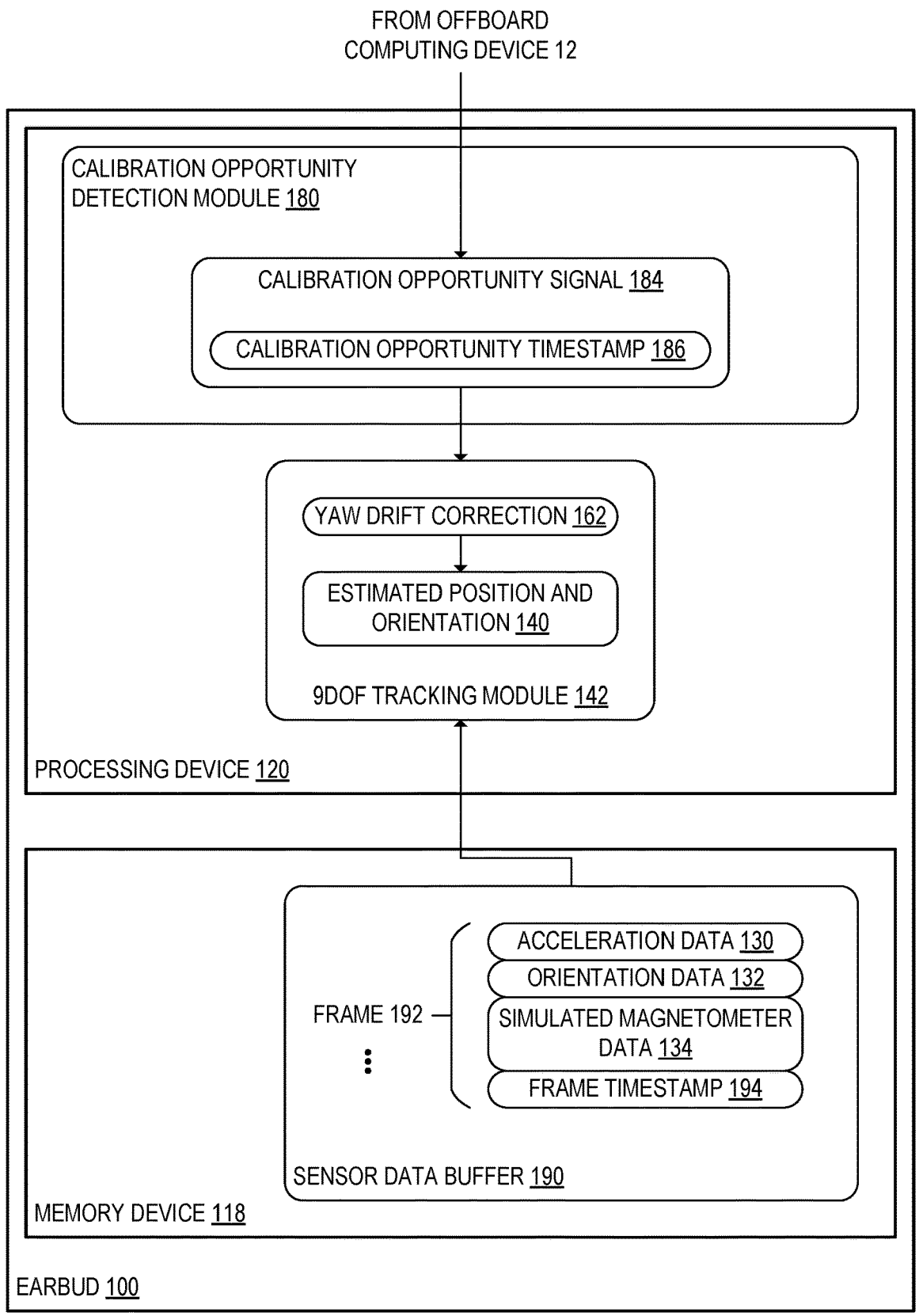
FIG. 7B schematically shows the earbud of FIG. 7A in an example in which a memory device of the earbud stores a sensor data buffer.

FIG. 7B schematically shows the earbud 100 of FIG. 7A in an example in which the memory device 118 is configured to store a sensor data buffer 190 of one or more frames 192. The frames 192 each include respective values of the acceleration data 130, the orientation data 132, and the simulated magnetometer data 134 at a corresponding timestep. For example, the sensor data buffer 190 may store sensor data collected at the earbud 100 in a predetermined number of timesteps prior to a current timestep. Each frame 192 may further include a respective frame timestamp 194.

In examples in which the memory device 118 stores the sensor data buffer 190, the processing device 120 may, in response to receiving the calibration opportunity signal 184, be further configured to perform the motion tracking calibration based at least in part on the one or more frames 192 stored in the sensor data buffer 190. For example, the calibration opportunity signal 184 may include a calibration opportunity timestamp 186, and the processing device 120 may be configured to select sensor data stored in a frame 192 with a corresponding frame timestamp 194. By performing the motion tracking calibration based at least in part on the one or more frames 192, the processing device 120 may be configured to account for a delay between the generation of the calibration opportunity signal 184 at the offboard computing device 12 and computation of the yaw drift correction 162 at the processing device 120 of the earbud 100. The conditions that facilitate accurate calibration, as indicated in the calibration opportunity signal 184, may end before the calibration opportunity signal 184 is received at the processing device 120. Therefore, by utilizing sensor data stored in the sensor data buffer 190 at a timestep during which the calibration opportunity is detected, as indicated by the calibration opportunity timestamp 186, the processing device 120 may increase the accuracy of the motion tracking calibration.

Returning to the example of FIG. 4, the processing device 120 is further configured to output the estimated position and orientation 140 to an additional computing process. The estimated position and orientation 140 are transmitted to the offboard computing device 12 for further processing in the example of FIG. 4. In the example of FIG. 4, the processing device 120 is further configured to receive spatial audio generating instructions 152 from the offboard computing device 12 at a spatial audio generating module 150. The processing device 120 is further configured to output spatial audio 154 generated at the spatial audio generating module 150 via the one or more speakers 102. When the processing device 120 generates the spatial audio 154, the processing device 120 is configured to localize the spatial audio 154 based at least in part on the estimated position and orientation 140.

Figure 8:
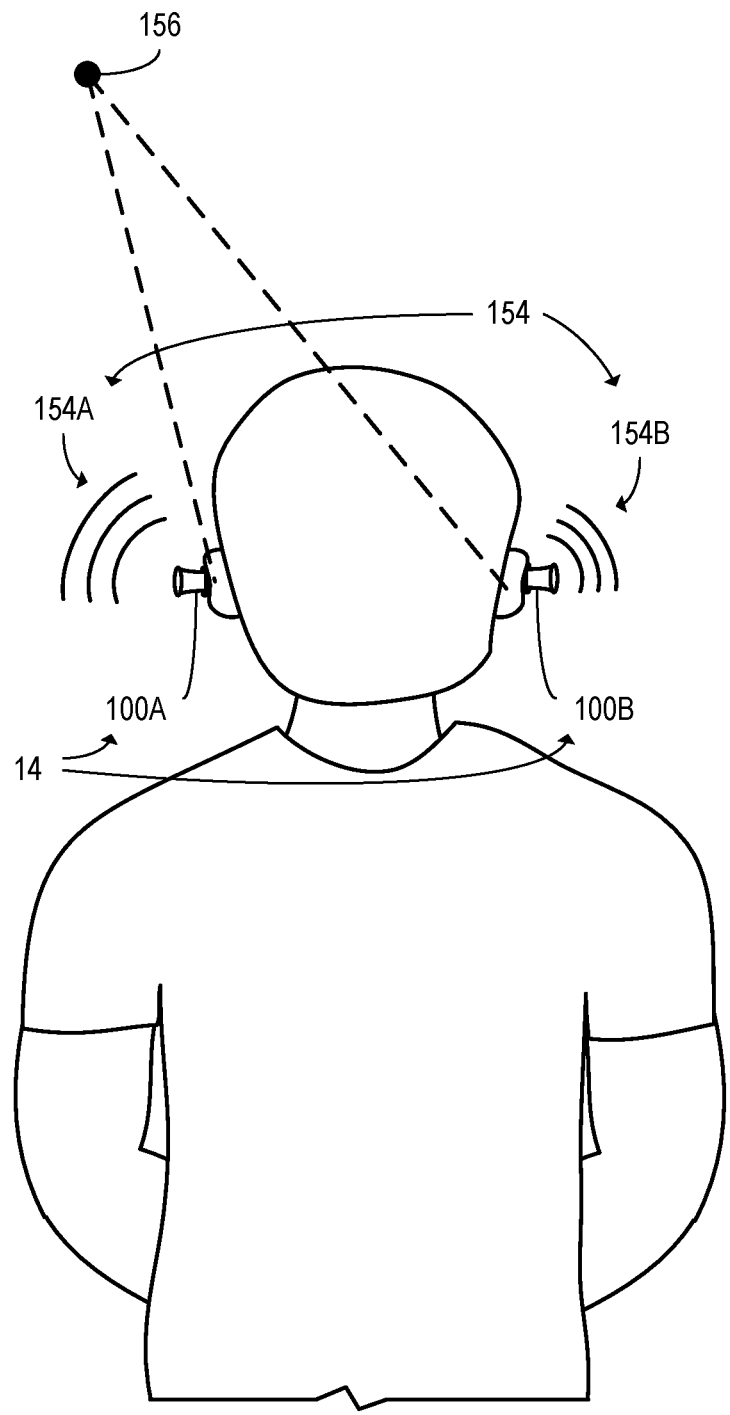
FIG. 8 shows an example of a perceived spatial audio location generated at the wearable device, according to the example of FIG. 1.

FIG. 8 shows an example of a perceived spatial audio location 156 generated at the wearable device 14. The spatial audio 154 is localized at the perceived spatial audio location 156 by outputting a first spatial audio signal 154A from the left earbud 100A and a second spatial audio signal 154B from the right earbud 100B. Differences between the respective waveforms of the first spatial audio signal 154A and the second spatial audio signal 154B mimic the differences between sounds that would be heard at the user's left and right ears, respectively, if the a sound were emitted at the perceived spatial audio location 156. The processing device 120 may introduce these differences between the first spatial audio signal 154A and the second spatial audio signal 154B by offsetting the respective waveforms of the first spatial audio signal 154A and the second spatial audio signal 154B from each other in time. The first spatial audio signal 154A and the second spatial audio signal 154B may also differ in amplitude. In order to accurately localize the perceived spatial audio location 156, the processing device 120 is configured to account for the spatial position and orientation of the wearable device 14 when the spatial audio 154 is generated. Accordingly, increasing the accuracy of the estimated position and orientation 140 of the wearable device 14 may allow the processing device 120 to generate spatial audio 154 that is perceived as closer to an intended location. The spatial audio 154 will thus be reproduced with greater fidelity, user may therefore have a more authentic and immersive experience of the spatial audio 154 as the designer of the audio experience intended.

As depicted in the example of FIG. 4, communication between the earbud 100 and the offboard computing device 12 is performed in a sequence of steps A, B, and C. In step A, the earbud 100 receives the simulated magnetometer data 134 from the offboard computing device 12. In step B, the earbud 100 transmits the estimated position and orientation 140 to the offboard computing device 12. In step C, the earbud 100 receives the spatial audio generating instructions 152 from the offboard computing device 12. The computing system 10 may accordingly utilize the higher computing power of the offboard computing device 12, as well as one or more of the sensors included in the sensor suite 20 of the offboard computing device 12, when computing the simulated magnetometer data 134 and the spatial audio generating instructions 152.

Returning to the example of FIG. 2, additional details related to computing processes performed at the offboard computing device 12 are now provided. The sensors included in the sensor suite 20 of the offboard computing device 12 are configured to transmit data to the one or more processing devices 16 included in the offboard computing device 12. The one or more processing devices 16 are configured to receive imaging data 40 of the wearable device 14 via the imaging sensor 22. In addition, the one or more processing devices 16 are further configured to receive computing device acceleration data 42 via the accelerometer 24, receive computing device orientation data 44 via the gyroscope 26, and receive computing device magnetic field data 46 via the magnetometer 28. In some examples, as discussed in further detail below, the imaging data 40 may be received at a separate processing device 16 from the computing device acceleration data 42, the computing device orientation data 44, and the computing device magnetic field data 46.

Based at least in part on the imaging data 40, the one or more processing devices 16 are further configured to compute an estimated position and orientation 50 of the wearable device 14 relative to the imaging sensor 22. The estimated position and orientation 50 may, for example, be expressed as an estimated position vector 50A and an estimated orientation vector 50B. The one or more processing devices 16 are further configured to compute motion tracking calibration data 52 associated with the wearable device 14 based at least in part on the estimated position and orientation 50, the computing device acceleration data 42, the computing device orientation data 44, and the computing device magnetic field data 46. The motion tracking calibration data 52 is computed at a 9DOF tracking module 54 executed at the one or more processing devices 16 in the example of FIG. 2. In addition, the one or more processing devices 16 are further configured to transmit the motion tracking calibration data 52 to the wearable device 14.

When computing the motion tracking calibration data 52, the one or more processing devices 16 are configured to account for movement of the offboard computing device 12. The one or more processing devices 16 are further configured to offset the estimated position and orientation 50 of the wearable device 14 relative to the offboard computing device 12 based at least in part on the computing device acceleration data 42 and the computing device orientation data 44. Thus, the one or more processing devices 16 are configured to compute an offset estimated position and orientation 56 of the wearable device 14. The computing device magnetic field data 46 may additionally be utilized when computing the offset estimated position and orientation 56. The one or more processing devices 16 are therefore configured to estimate the position and orientation of the wearable device 14 in a reference frame defined by a fixed location in the user's physical environment rather than a reference frame defined relative to the offboard computing device 12. The one or more processing devices 16 are further configured to compute the motion tracking calibration data 52 based at least in part on the offset estimated position and orientation 56. The motion tracking calibration data 52 may therefore be expressed in the same reference frame as the estimated position and orientation 140 computed at the wearable device 14.

Figure 9:
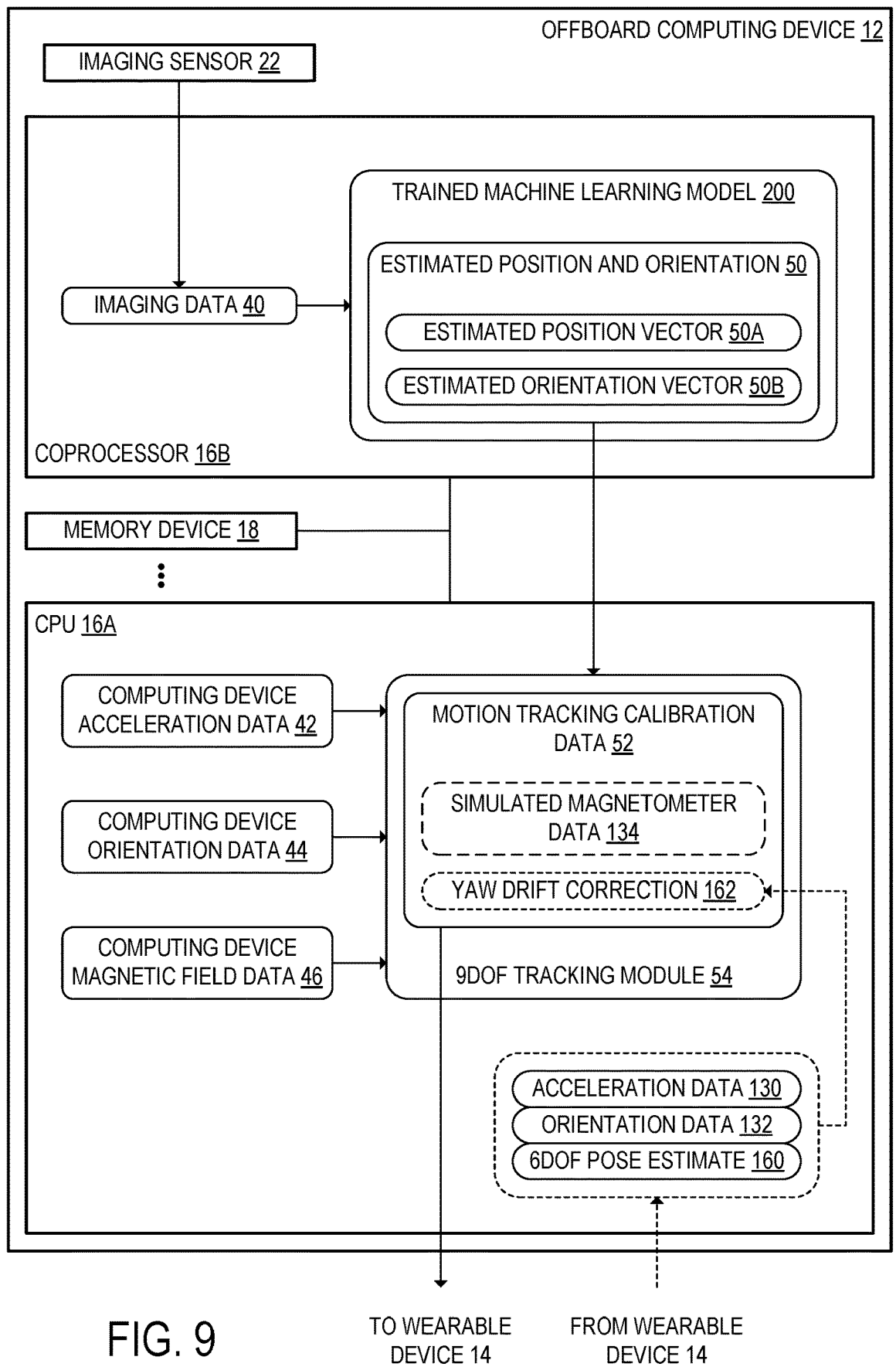
FIG. 9 schematically shows the offboard computing device when imaging data is processed, according to the example of FIG. 2.

FIG. 9 shows the offboard computing device 12 in additional detail when the imaging data 40 is processed at the one or more processing devices 16. In the example of FIG. 9, the computing device acceleration data 42, the computing device orientation data 44, and the computing device magnetic field data 46 are received at a central processing unit (CPU) 16A included among the one or more processing devices 16, whereas the imaging data 40 is received at a coprocessor 16B. At the coprocessor 16B, the offboard computing device 12 is configured to compute the estimated position and orientation 50 of the wearable device 14 at least in part at a trained machine learning model 200. The trained machine learning model 200 in the example of FIG. 9 is configured to perform object recognition on the imaging data 40 to identify the wearable device 14 within the field of view of the imaging sensor 22. The trained machine learning model 200 may, for example, be a multi-layer perceptron (MLP) model, a convolutional neural network (CNN), a transformer network, or some other type of machine learning model. In the example of FIG. 9, the coprocessor 16B is further configured to output the estimated position and orientation 50 to the CPU 16A.

By computing the estimated position and orientation 50 from the imaging data 40 at the coprocessor 16B rather than at the CPU 16A, the offboard computing device 12 may utilize a processing device architecture that performs machine learning model inferencing more quickly and efficiently than the CPU 16A. For example, the coprocessor 16B may be a graphics processing unit (GPU). In addition, the offboard computing device 12 may avoid transmitting the raw imaging data 40 to the CPU 16A by processing the imaging data 40 at the coprocessor 16B and transmitting the estimated position and orientation 50 of the wearable device 14 to the CPU 16A instead. Thus, processing the imaging data 40 at the coprocessor 16B may function as a security feature that makes unauthorized access to the raw imaging data 40 more difficult for malicious programs executed at the CPU 16A.

In some examples in which the imaging data 40 is processed at a coprocessor 16B, the imaging data 40 received at the coprocessor 16B may have a lower resolution than other imaging data received from the imaging sensor 22 at the CPU 16A when performing other computing processes. For example, a photography application program may collect imaging data with a higher image resolution than the imaging data 40 used to compute the estimated position and orientation 50. Using low-resolution imaging data 40 may reduce power consumption by the offboard computing device 12 while still allowing the position and orientation of the wearable device 14 to be estimated accurately.

As depicted in FIG. 9, the motion tracking calibration data 52 generated at the CPU 16A may include the simulated magnetometer data 134 in some examples. The offboard computing device 12 is configured to transmit the simulated magnetometer data 134 to the wearable device 14 in such examples. Thus, in such examples, motion tracking calibration data 52 that provides information about the yaw of the wearable device 14 is obtained via imaging at the offboard computing device 12 and is converted into a form in which it is usable as an input to a 9DOF motion tracking algorithm executed at the wearable device 14.

In some examples, as an alternative to generating simulated magnetometer data 134 that is transmitted to the wearable device 14, the motion tracking calibration data 52 may include the yaw drift correction 162. In examples in which the motion tracking calibration data 52 includes the yaw drift correction 162, the wearable device 14 may be configured to offload the computation of the yaw drift correction 162 to the offboard computing device 12. The CPU 16A may, in such examples, be configured to receive the acceleration data 130 and the orientation data 132 from the wearable device 14. Alternatively, the CPU 16A may be configured to receive the 6DOF pose estimate 160 from the wearable device 14. By offloading computation of the motion tracking calibration data 52 to the offboard computing device 12, motion tracking calibration for the wearable device 14 may be performed using larger amounts of computing resources that would be available at the processing device 120 and memory device 118 of the wearable device 14.

Figure 10:
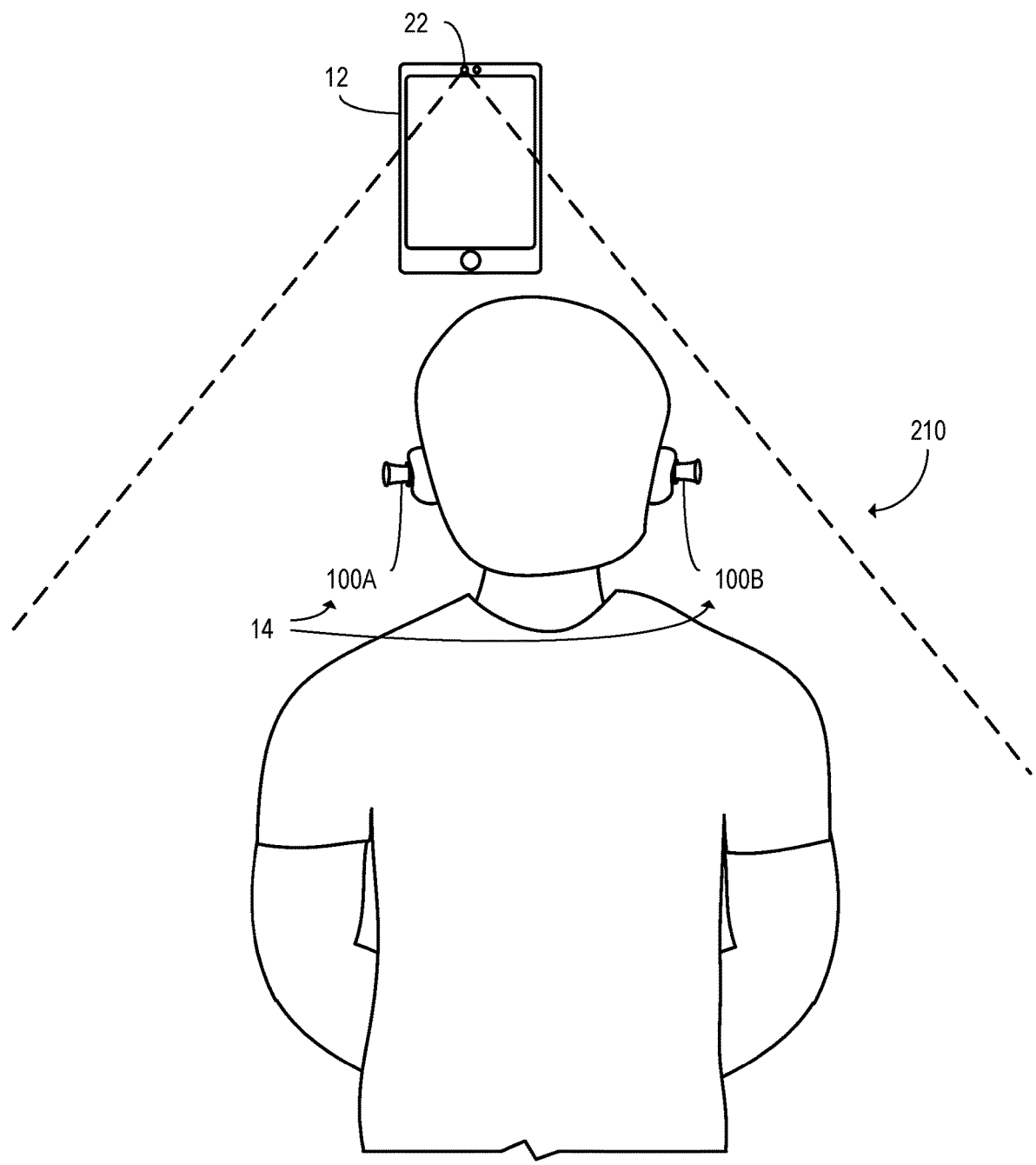
FIG. 10 shows the offboard computing device when the imaging sensor collects imaging data of a user wearing the wearable device, according to the example of FIG. 2.

FIG. 10 shows the offboard computing device 12 when the imaging sensor 22 collects imaging data of a user wearing the wearable device 14, according to one example. In the example of FIG. 10, the left earbud 100A and the right earbud 100B included in the wearable device 14 are within a field of view 210 of the imaging sensor 22.

Figure 11:
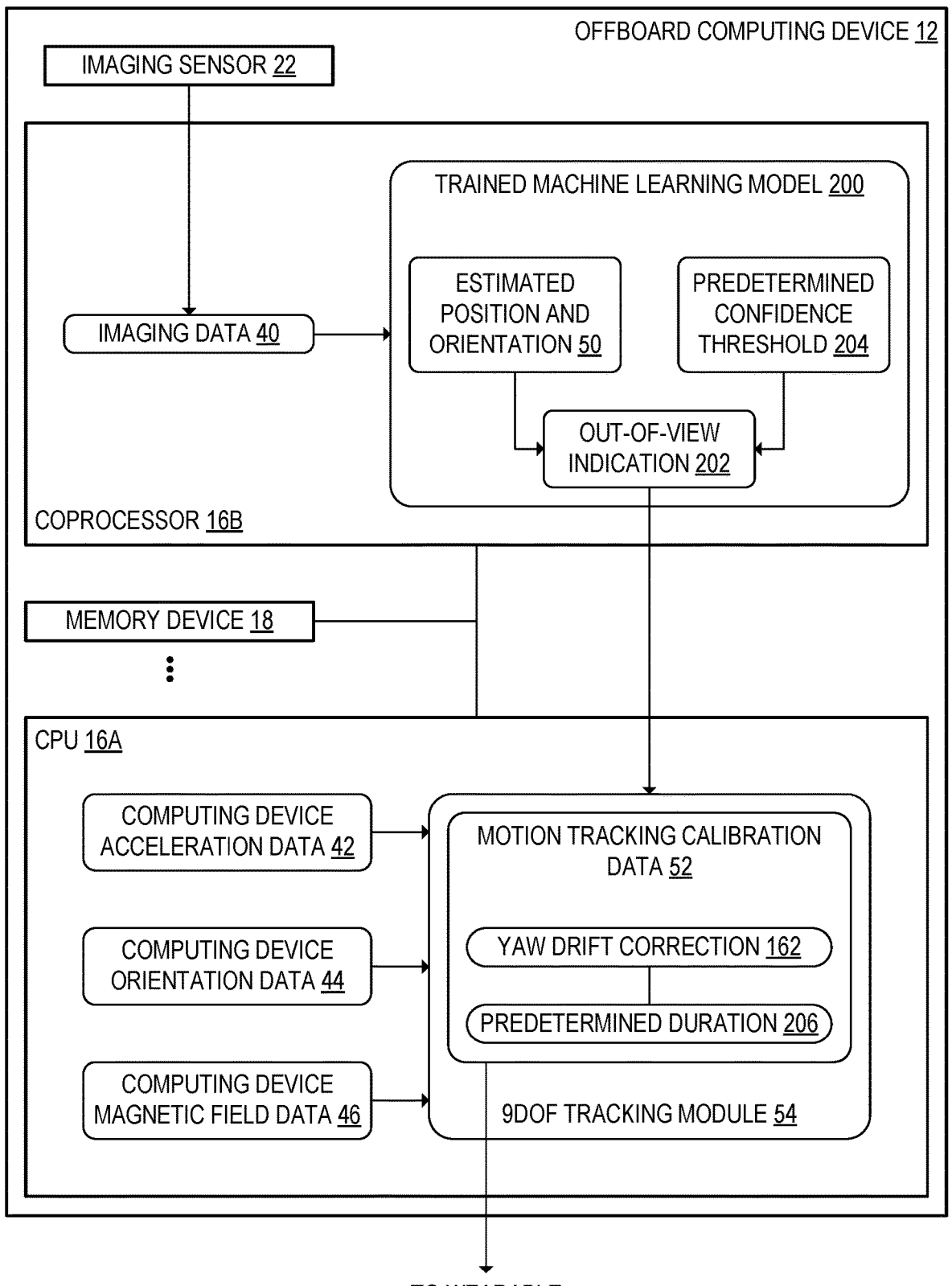
FIG. 11 schematically shows the offboard computing device when the wearable device is determined to be outside the field of view of the imaging sensor, according to the example of FIG. 9.

FIG. 11 schematically shows the offboard computing device 12 when the wearable device 14 is determined to be outside the field of view 210 of the imaging sensor 22. As depicted in the example of FIG. 11, when the one or more processing devices 16 of the offboard computing device 12 process the imaging data 40, the one or more processing devices 16 are further configured to determine, based at least in part on the imaging data 40, that the wearable device 14 is outside a field of view 210 of the imaging sensor 22. For example, the out-of-view indication 202 may be an output of the trained machine learning model 200 that is generated when the trained machine learning model 200 does not detect the wearable device 14 with a confidence above a predetermined confidence threshold 204 at any location in the field of view 210. The coprocessor 16B may be configured to output an out-of-view indication 202 to the CPU 16A in response to determining that the wearable device 14 is outside the field of view 210.

The CPU 16A is configured to receive the out-of-view indication 202 from the coprocessor 16B. In response to determining that the wearable device 14 is outside the field of view 210 of the imaging sensor 22, as indicated by the out-of-view indication 202, the CPU 16A is further configured to transmit, to the wearable device 14, instructions to apply the yaw drift correction 162 until a predetermined duration 206 has elapsed. Accordingly, the wearable device 14 may continue to correct for yaw drift even when the wearable device 14 is outside the field of view of the imaging sensor 22. The estimated position and orientation 140 computed at the wearable device 14 may therefore remain accurate for a longer period of time.

Although, in the above examples, motion tracking of the wearable device 14 is performed in order to provide spatial audio 154 via the wearable device 14, motion tracking may additionally or alternatively be performed for the wearable device 14 in other contexts. For example, 9DOF tracking of the position and orientation of the wearable device 14 may be performed when the position and orientation of the wearable device 14 are used to provide user input to the offboard computing device 12, such as by controlling the location of a cursor. As another example, the position and orientation of the wearable device 14 may be tracked in order to identify whether the user is looking at the imaging sensor 22 of the offboard computing device 12. In such examples, image tracking may allow the offboard computing device 12 to determine whether the user is looking at the imaging sensor 22 in scenarios in which the user's eyes are at least partially obscured.

Figure 12A:
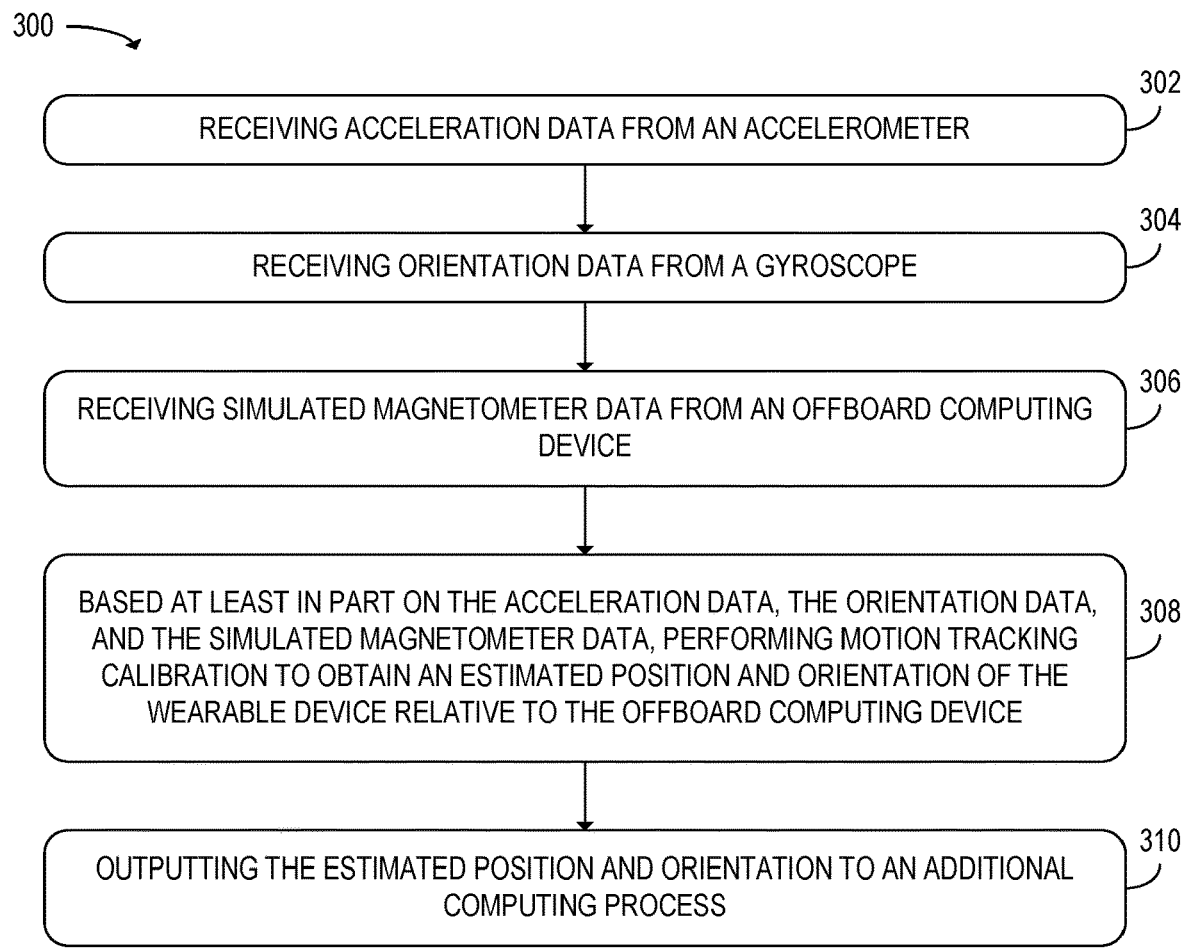
FIG. 12A shows a flowchart of a method for use with a wearable device to generate an estimated position and orientation, according to the example of FIG. 1.

FIG. 12A shows a flowchart of a method 300 for use with a wearable device. The wearable device may be a wearable audio device that includes one or more speakers, such as a headphone device or earbud device. In the example of FIG. 12A, the wearable device further includes an accelerometer and a gyroscope but does not include a magnetometer. At step 302, the method 300 includes receiving acceleration data from the accelerometer. In addition, at step 304, the method 300 further includes receiving orientation data from the gyroscope. The orientation data includes an angular orientation and an angular velocity of the wearable device.

At step 306, the method 300 further includes receiving simulated magnetometer data from an offboard computing device. The simulated magnetometer data may be a simulation of magnetic field data that would be collected at the wearable device if the wearable device included a magnetometer, and the magnetometer did not experience electromagnetic interference from the one or more speakers or other electronic components of the wearable device. The simulated magnetometer data is computed at the offboard computing device using data collected from sensors included in the offboard computing device and is transmitted to the wearable device via a wireless connection.

At step 308, the method 300 further includes performing motion tracking calibration to obtain an estimated position and orientation of the wearable device relative to the offboard computing device. The motion tracking calibration is performed based at least in part on the acceleration data, the orientation data, and the simulated magnetometer data. For example, sensor fusion of the simulated magnetometer data with the acceleration data and the orientation data may be used to increase the accuracy of 6DOF position and orientation estimates computed from the acceleration data and the orientation data.

At step 310, the method 300 further includes outputting the estimated position and orientation to an additional computing process. In some examples, the estimated position and orientation are transmitted to the offboard computing device. Additionally or alternatively, the estimated position and orientation of the wearable device may be used as inputs to an additional computing process executed onboard the wearable device. As discussed below, the additional computing process may be a spatial audio generating module in some examples. Alternatively, some other additional computing process such as a gaze tracking module and/or a user input module may receive the estimated position and orientation. This may enable improved accuracy in tracking a user's gaze and/or improved accuracy in detecting a user input, for example.

Figure 12B:
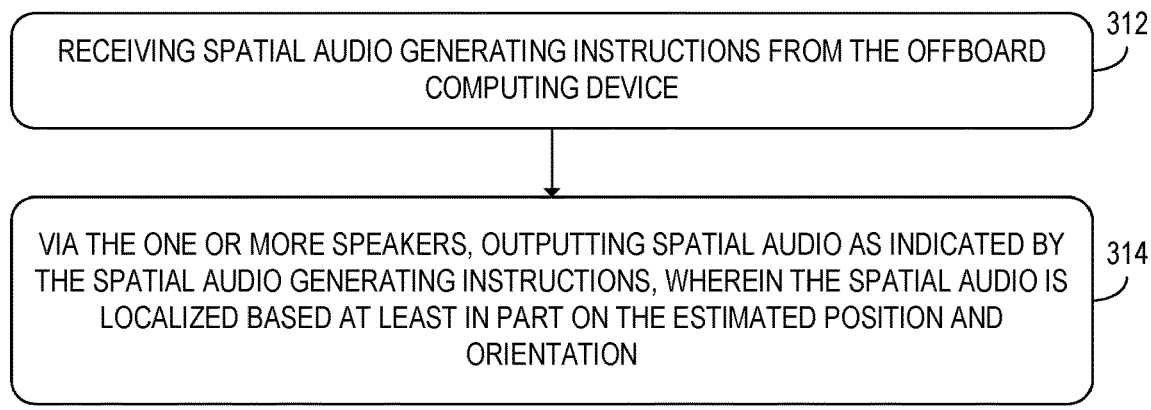
FIGS. 12B-12G show additional steps of the method of FIG. 12A that are performed in some examples.

FIGS. 12B-12G show additional steps of the method 300 that may be performed in some examples. FIG. 12B shows steps that may be performed in examples in which the wearable device is a wearable audio device. At step 312, the method 300 further includes receiving spatial audio generating instructions from the offboard computing device. The spatial audio generating instructions may, for example, specify a perceived spatial audio location in the physical environment within which the user of the wearable device is located.

At step 314, the method 300 further includes outputting spatial audio as indicated by the spatial audio generating instructions via the one or more speakers. The spatial audio is localized based at least in part on the estimated position and orientation. For example, the location of the wearable device relative to the perceived spatial audio location may be computed using the estimated position and orientation. The wearable device may then apply one or more temporal offsets and/or amplitude changes to one or more respective audio outputs generated at the one or more speakers such that the spatial audio has the perceived spatial audio location. For example, the wearable device may transmit differing audio signals to a left earbud and a right earbud. These differing audio signals may be computed based at least in part on the estimated position and orientation of the wearable device relative to the perceived spatial audio location.

Figure 12C:
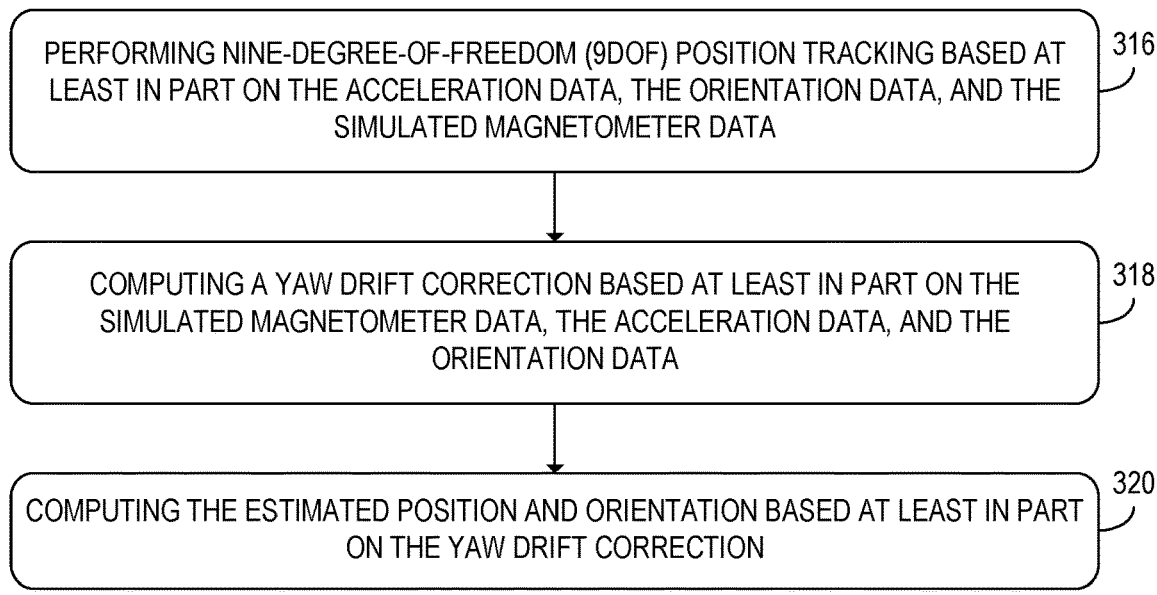

FIG. 12C shows additional steps of the method 300 that may be performed when performing motion tracking calibration at step 308. At step 316, the method 300 further includes performing 9DOF position tracking based at least in part on the acceleration data, the orientation data, and the simulated magnetometer data. A 9DOF sensor fusion algorithm such as Kalman filtering or complementary filtering may be used to perform the 9DOF position tracking.

At step 318, the method 300 further includes computing a yaw drift correction based at least in part on the simulated magnetometer data, the acceleration data, and the orientation data. The yaw drift correction adjusts for calibration drift in the yaw direction. In computing devices that include magnetometers, yaw drift is typically corrected via sensor fusion utilizing magnetometer data. The simulated magnetometer data is instead used to compute the yaw drift correction in the example of FIG. 12C. At step 320, the method 300 further includes computing the estimated position and orientation based at least in part on the yaw drift correction. Thus, the estimated position and orientation are corrected for yaw drift.

Figure 12D:
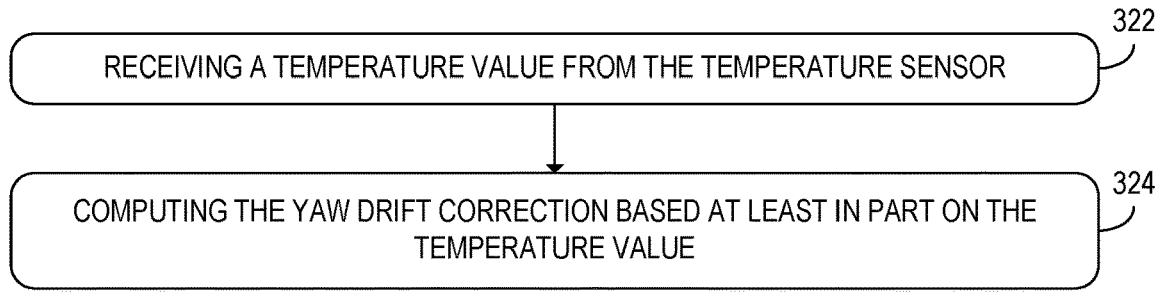

FIG. 12D shows additional steps of the method 300 that may be performed in examples in which the steps of FIG. 12C are performed and in which the wearable device includes a temperature sensor. At step 322, the method 300 further includes receiving a temperature value from the temperature sensor. At step 324, the method 300 further includes computing the yaw drift correction based at least in part on the temperature value. Since the amount of yaw drift that occurs at the wearable device may vary as a function of temperature, the wearable device may use the temperature value as an additional input when computing the yaw drift correction.

Figure 12E:
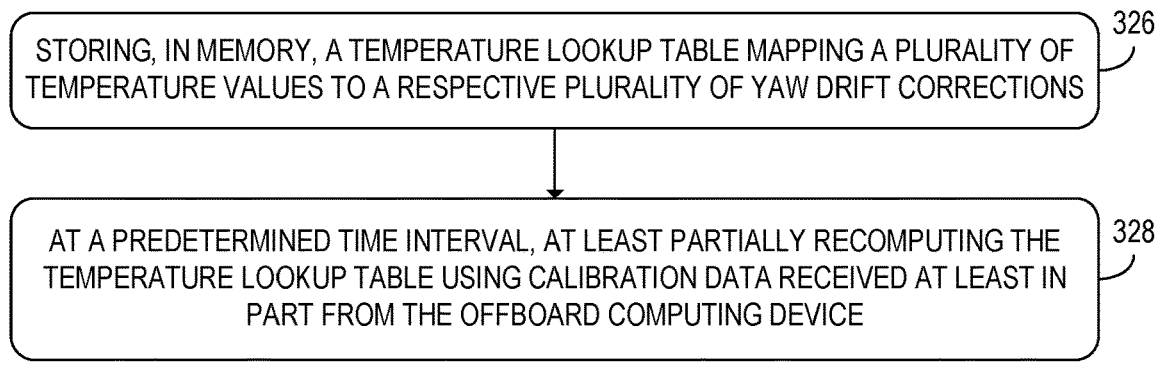

FIG. 12E shows additional steps of the method 300 that may be performed in examples in which the steps of FIG. 12D are performed. Via the steps shown in FIG. 12E, the relationship between temperature and yaw drift may be determined. At step 326, the method 300 further includes storing, in memory, a temperature lookup table mapping a plurality of temperature values to a respective plurality of yaw drift corrections. The entries included in the temperature lookup table may be generated over time as motion tracking calibration is performed for the wearable device at a plurality of different temperatures. At step 328, the method 300 further includes at least partially recomputing the temperature lookup table at a predetermined time interval. The temperature lookup table may be recomputed using calibration data received at least in part from the offboard computing device. For example, the calibration data may include the simulated magnetometer data. Additionally or alternatively, the calibration data may include one or more values of the yaw drift correction received from the offboard computing device. By recomputing the temperature lookup table, the wearable device may account for the effects of device aging on the yaw drift.

Figure 12F:
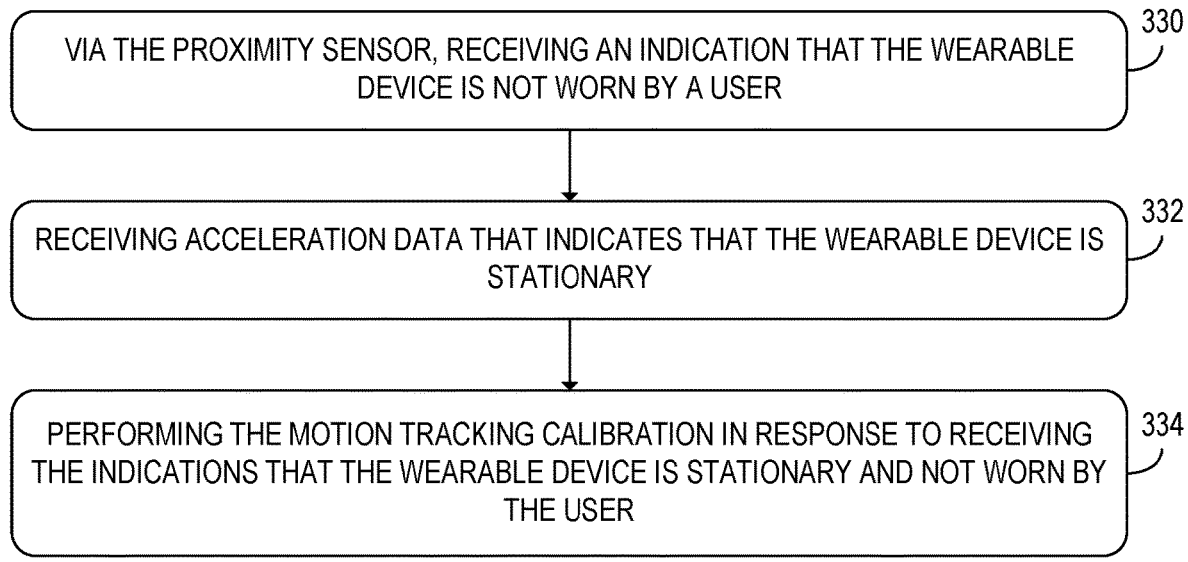

FIG. 12F shows additional steps of the method 300 that may be performed in examples in which the wearable device further includes a proximity sensor. At step 330, the method 300 further includes, via the proximity sensor, receiving an indication that the wearable device is not worn by a user. In addition, at step 332, the method 300 further includes receiving acceleration data that indicates that the wearable device is stationary. At step 334, the method 300 further includes performing the motion tracking calibration in response to receiving the indications that the wearable device is stationary and not worn by the user. In some examples, the motion tracking calibration may be performed in response to additionally or alternatively receiving orientation data that indicates that the orientation of the wearable device is constant. Thus, the motion tracking of the wearable device may be calibrated under conditions in which the angular velocity of the wearable device in the yaw direction is expected to be zero.

Figure 12G:
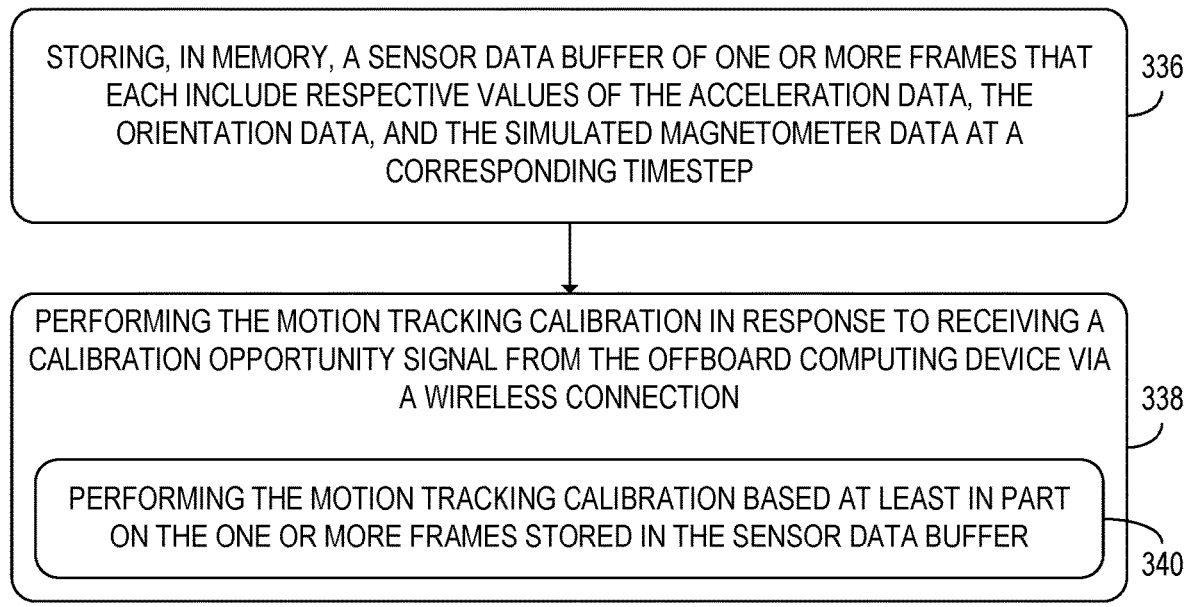

Additional steps of the method 300 are shown in FIG. 12G. At step 336, the method 300 further includes storing, in memory, a sensor data buffer of one or more frames that each include respective values of the acceleration data, the orientation data, and the simulated magnetometer data at a corresponding timestep. At step 338, the method 300 further includes performing the motion tracking calibration in response to receiving a calibration opportunity signal from the offboard computing device via a wireless connection. For example, the calibration opportunity signal may indicate that the offboard computing device is stationary, as indicated by computing device acceleration data and computing device orientation data collected at the accelerometer and gyroscope of the offboard computing device. At step 340, step 338 includes performing the motion tracking calibration based at least in part on the one or more frames stored in the sensor data buffer. By performing the motion tracking calibration using the sensor data stored in the sensor data buffer, the wearable device may account for lag in the detection of the calibration opportunity.

Figure 13A:
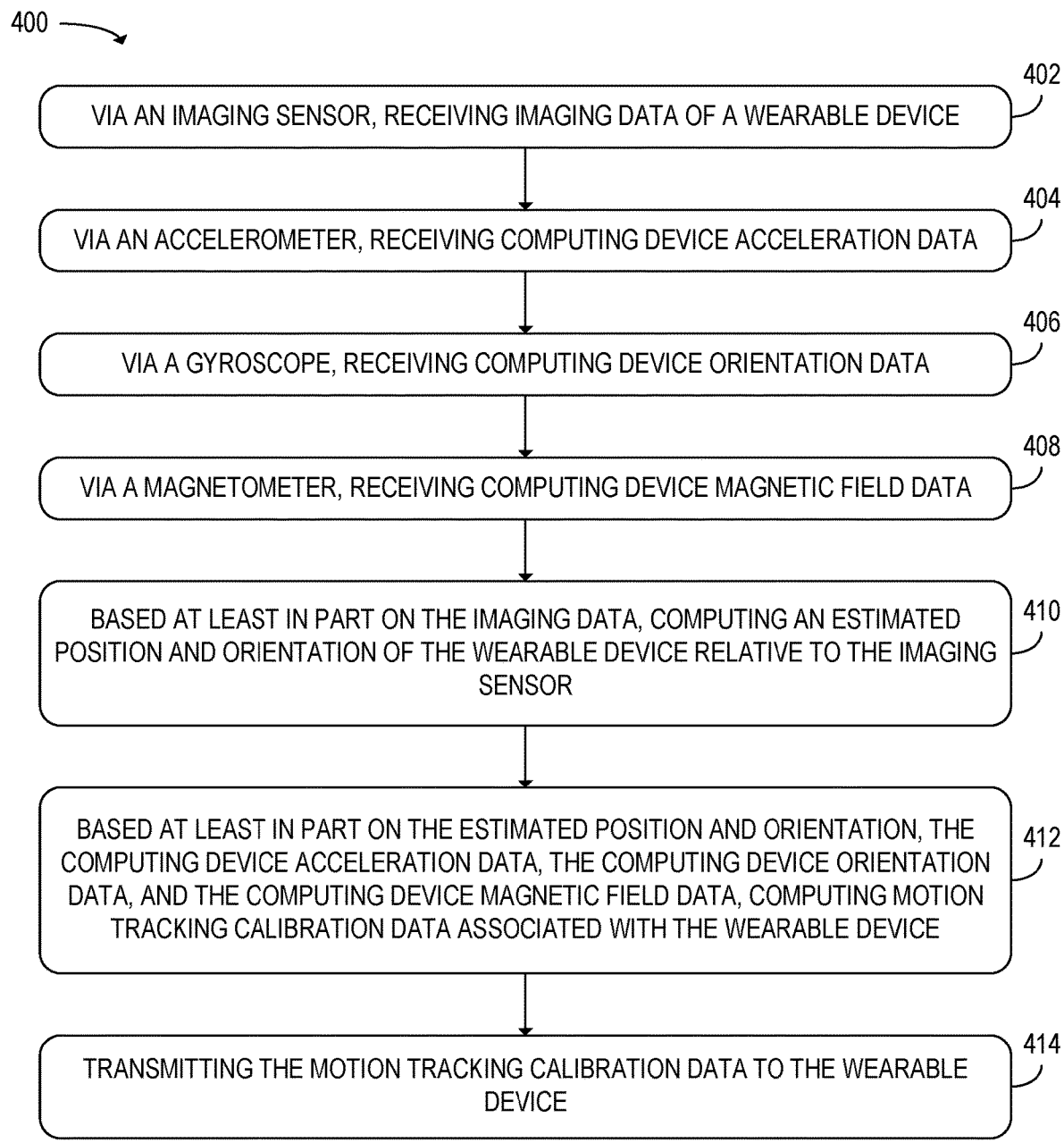
FIG. 13A shows a flowchart of a method for use with an offboard computing device to generate motion tracking calibration data for a wearable device, according to the example of FIG. 1.

FIG. 13A shows a flowchart of a method 400 for use with the offboard computing device communicatively coupled to the wearable device. In the example of FIG. 13A, the offboard computing device includes an imaging sensor, an accelerometer, a gyroscope, and a magnetometer. At step 402, the method 400 includes receiving imaging data of the wearable device via the imaging sensor. At step 404, the method 400 further includes receiving computing device acceleration data via the accelerometer. At step 406, the method 400 further includes receiving computing device orientation data via the gyroscope. The orientation data includes an angular orientation and an angular velocity of the offboard computing device. At step 408, the method 400 further includes receiving computing device magnetic field data via the magnetometer.

The method 400 further includes, at step 410, computing an estimated position and orientation of the wearable device relative to the imaging sensor based at least in part on the imaging data. In some examples, the estimated position and orientation are computed at least in part at a trained machine learning model. When the estimated position and orientation of the wearable device are computed, the offboard computing device may perform image recognition on the imaging data to identify the position and orientation of the wearable device within a field of view of the imaging sensor.

At step 412, the method 400 further includes computing motion tracking calibration data based at least in part on the estimated position and orientation, the computing device acceleration data, the computing device orientation data, and the computing device magnetic field data. In some examples, the motion tracking calibration data includes simulated magnetometer data associated with the wearable device. Additionally or alternatively, the motion tracking calibration data may include a yaw drift correction for the wearable device. At step 414, the method 400 further includes transmitting the motion tracking calibration data to the wearable device.

Figure 13B:
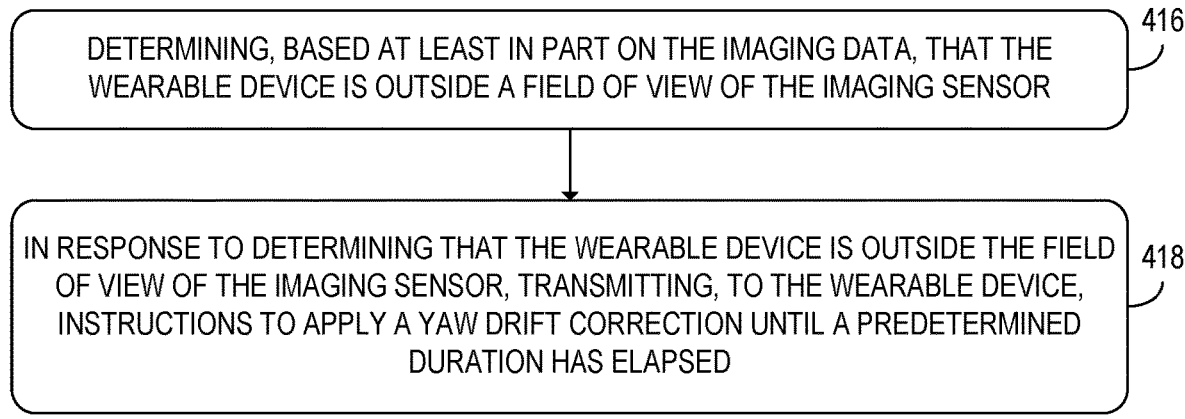
FIGS. 13B-13C show additional steps of the method of FIG. 13A that are performed in some examples.
Figure 13C:
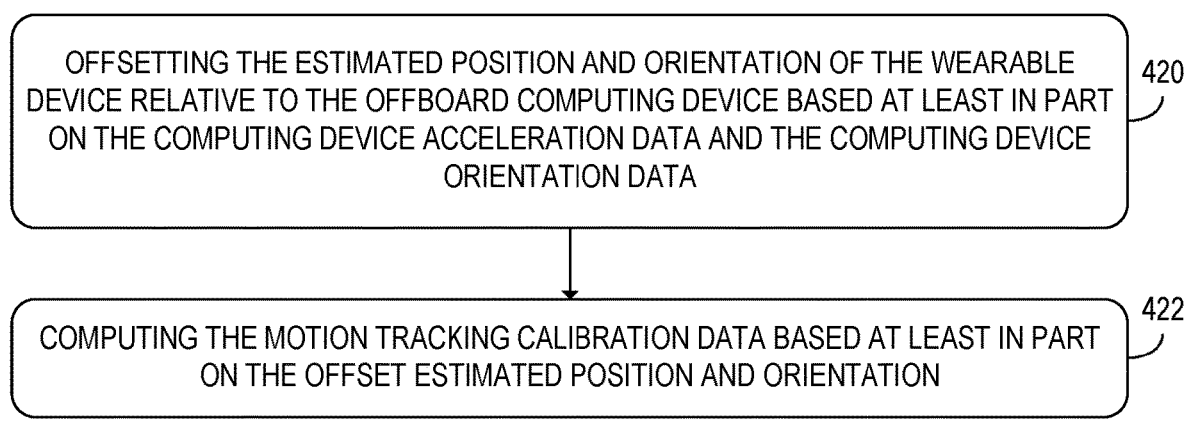

FIGS. 13B and 13C show additional steps of the method 400 that may be performed in some examples. The additional steps performed in FIG. 13B may be performed in examples in which the motion tracking calibration data includes a yaw drift correction. At step 416, shown in FIG. 13B, the method 400 further includes determining, based at least in part on the imaging data, that the wearable device is outside a field of view of the imaging sensor. At step 418, in response to determining that the wearable device is outside the field of view of the imaging sensor, the method 400 further includes transmitting, to the wearable device, instructions to apply the yaw drift correction until a predetermined duration has elapsed. The wearable device may accordingly continue to adjust for yaw drift when outside the field of view of the imaging sensor included in the offboard computing device.

FIG. 13C shows additional steps that may be performed to adjust for movement of the offboard computing device. At step 420, the method 400 further includes offsetting the estimated position and orientation of the wearable device relative to the offboard computing device based at least in part on the computing device acceleration data and the computing device orientation data. At step 422, the method 400 further includes computing the motion tracking calibration data based at least in part on the offset estimated position and orientation. The offboard computing device may accordingly compute the motion tracking calibration data in a reference frame of the user's physical environment rather than a reference frame of the offboard computing device.

Using the devices and methods discussed above, accurate motion tracking may be performed at a wearable device that experiences high levels of electromagnetic interference from an electronic component such as a speaker. Thus, the increase in motion tracking accuracy that would typically be achieved using a magnetometer may be provided even for devices in which a magnetometer would output inaccurate readouts. The increase in position and orientation tracking accuracy achieved using the devices and methods discussed above may allow spatial audio signals to be more accurately produced such that the user perceives the spatial audio as originating from an intended location.

In some embodiments, the methods and processes described herein may be tied to a computing system of one or more computing devices. In particular, such methods and processes may be implemented as a computer-application program or service, an application-programming interface (API), a library, and/or other computer-program product.

Figure 14:
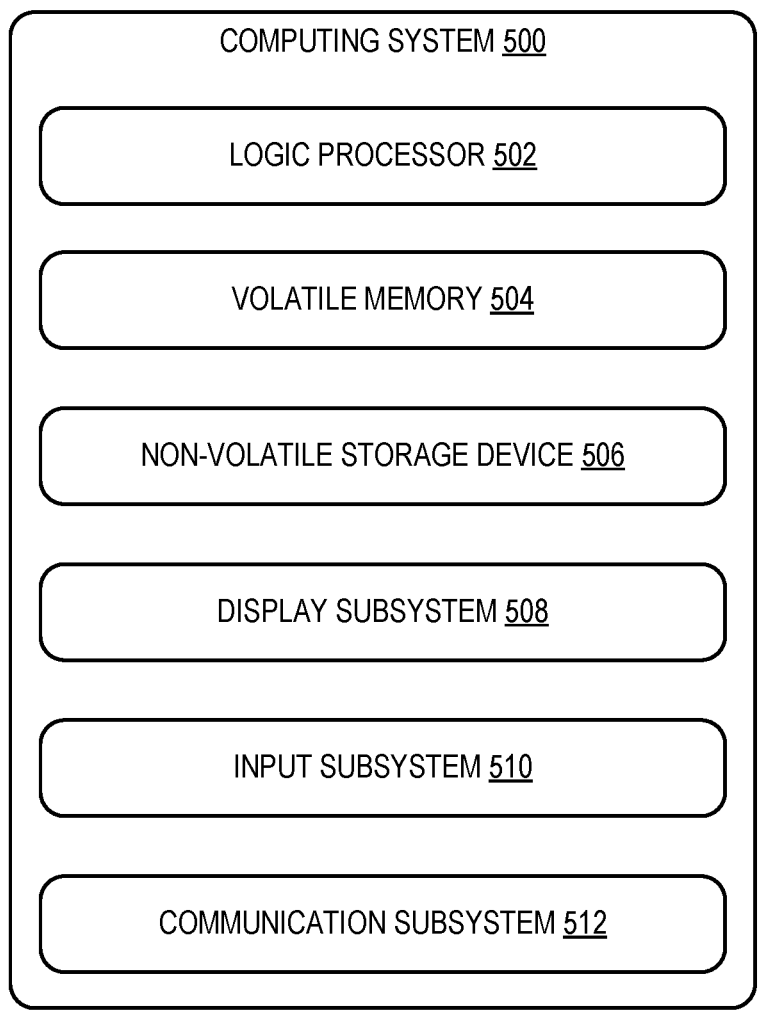
FIG. 14 shows a schematic view of an example computing environment in which the computing system of FIG. 1 may be enacted.

FIG. 14 schematically shows a non-limiting embodiment of a computing system 500 that can enact one or more of the methods and processes described above. Computing system 500 is shown in simplified form. Computing system 500 may embody the computing system 10 described above and illustrated in FIG. 1. Components of computing system 500 may be included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 14.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built-in. Non-volatile storage device 506 may include optical memory, semiconductor memory, and/or magnetic memory, or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

The following paragraphs discuss several aspects of the present disclosure. According to one aspect of the present disclosure, a wearable device is provided, including an accelerometer, a gyroscope, and a processing device. The processing device is configured to receive acceleration data from the accelerometer, receive orientation data from the gyroscope, and receive simulated magnetometer data from an offboard computing device. Based at least in part on the acceleration data, the orientation data, and the simulated magnetometer data, the processing device is further configured to perform motion tracking calibration to obtain an estimated position and orientation of the wearable device relative to the offboard computing device. The processing device is further configured to output the estimated position and orientation to an additional computing process. The above features may have the technical effect of increasing the accuracy of the motion tracking calibration.

According to this aspect, the wearable device may be a wearable audio device that includes one or more speakers. The processing device may be further configured to receive spatial audio generating instructions from the offboard computing device. Via the one or more speakers, the processing device may be further configured to output spatial audio as indicated by the spatial audio generating instructions. The processing device may be configured to localize the spatial audio based at least in part on the estimated position and orientation. The above features may have the technical effect of producing spatial audio that is more accurately localized at a perceived location.

According to this aspect, the processing device may be further configured to perform nine-degree-of-freedom (9DOF) position tracking using the acceleration data, the orientation data, and the simulated magnetometer data to compute the estimated position and orientation. The above features may have the technical effect of increasing the accuracy of the motion tracking calibration.

According to this aspect, the processing device may be configured to perform the motion tracking calibration at least in part by computing a yaw drift correction based at least in part on the simulated magnetometer data, the acceleration data, and the orientation data. Performing the motion tracking calibration may further include computing the estimated position and orientation based at least in part on the yaw drift correction. The above features may have the technical effect of correcting for yaw drift when computing the estimated position and orientation.

According to this aspect, the wearable device may further include a temperature sensor. The processing device may be further configured to receive a temperature value from the temperature sensor. The processing device may be further configured to compute the yaw drift correction based at least in part on the temperature value. The above features may have the technical effect of adjusting for temperature dependence of the yaw drift when computing the estimated position and orientation.

According to this aspect, the wearable device may further include a memory device. The memory device may store a temperature lookup table mapping a plurality of temperature values to a respective plurality of yaw drift corrections. At a predetermined time interval, the processing device may be further configured to at least partially recompute the temperature lookup table using calibration data received at least in part from the offboard computing device. The above features may have the technical effect of allowing the temperature correction to be applied to the yaw value of the wearable device without having to receive the yaw drift correction from the offboard computing device. The above features may have the additional technical effect of adjusting the temperature lookup table for device aging.

According to this aspect, the wearable device may further include a proximity sensor. Via the proximity sensor, the processing device may be further configured to receive an indication that the wearable device is not worn by a user. The acceleration data may further indicate that the wearable device is stationary. The processing device may be further configured to perform the motion tracking calibration in response to receiving the indications that the wearable device is stationary and not worn by the user. The above features may have the technical effect of obtaining a baseline value of the yaw drift.

According to this aspect, the processing device may be configured to perform the motion tracking calibration in response to receiving a calibration opportunity signal from the offboard computing device via a wireless connection. The above features may have the technical effect of offloading, to the offboard computing device, determination of the timing at which the motion tracking calibration is performed.

According to this aspect, the wearable computing device may further include a memory device. The memory device may be configured to store a sensor data buffer of one or more frames that each include respective values of the acceleration data, the orientation data, and the simulated magnetometer data at a corresponding timestep. In response to receiving the calibration opportunity signal, the processing device may be further configured to perform the motion tracking calibration based at least in part on the one or more frames stored in the sensor data buffer. The above features may have the technical effect of adjusting for lag in receiving the calibration opportunity signal from the offboard computing device after conditions conducive to performing motion tracking calibration have been detected.

According to another aspect of the present disclosure, a method for use with a wearable device is provided. The method includes receiving acceleration data from an accelerometer, receiving orientation data from a gyroscope, and receiving simulated magnetometer data from an offboard computing device. Based at least in part on the acceleration data, the orientation data, and the simulated magnetometer data, the method further includes performing motion tracking calibration to obtain an estimated position and orientation of the wearable device relative to the offboard computing device. The method further includes outputting the estimated position and orientation to an additional computing process. The above features may have the technical effect of increasing the accuracy of the motion tracking calibration.

According to this aspect, the wearable device may be a wearable audio device that includes one or more speakers. The method may further include receiving spatial audio generating instructions from the offboard computing device. Via the one or more speakers, the method may further include outputting spatial audio as indicated by the spatial audio generating instructions. The spatial audio may be localized based at least in part on the estimated position and orientation. The above features may have the technical effect of producing spatial audio that is more accurately localized at a perceived location.

According to this aspect, performing the motion tracking calibration may include performing nine-degree-of-freedom (9DOF) position tracking based at least in part on the acceleration data, the orientation data, and the simulated magnetometer data. The above features may have the technical effect of increasing the accuracy of the motion tracking calibration.

According to this aspect, performing the motion tracking calibration may include computing a yaw drift correction based at least in part on the simulated magnetometer data, the acceleration data, and the orientation data. Performing the motion tracking calibration may further include computing the estimated position and orientation based at least in part on the yaw drift correction. The above features may have the technical effect of correcting for yaw drift when computing the estimated position and orientation.

According to this aspect, the method may further include receiving a temperature value from a temperature sensor. The method may further include computing the yaw drift correction based at least in part on the temperature value. The above features may have the technical effect of adjusting for temperature dependence of the yaw drift when computing the estimated position and orientation.

According to another aspect of the present disclosure, a computing device is provided, including an imaging sensor, an accelerometer, a gyroscope, a magnetometer, and one or more processing devices. Via the imaging sensor, the one or more processing devices are configured to receive imaging data of a wearable device. Via the accelerometer, the one or more processing devices are configured to receive computing device acceleration data. Via the gyroscope, the one or more processing devices are configured to receive computing device orientation data. Via the magnetometer, the one or more processing devices are configured to receive computing device magnetic field data. Based at least in part on the imaging data, the one or more processing devices are configured to compute an estimated position and orientation of the wearable device relative to the imaging sensor. Based at least in part on the estimated position and orientation, the computing device acceleration data, the computing device orientation data, and the computing device magnetic field data, the one or more processing devices are configured to compute motion tracking calibration data associated with the wearable device. The one or more processing devices are configured to transmit the motion tracking calibration data to the wearable device. The above features may have the technical effect of providing the wearable device with motion tracking calibration data that the wearable device may use to perform more accurate motion tracking calibration.

According to this aspect, the motion tracking calibration data may include simulated magnetometer data associated with the wearable device. The above features may have the technical effect of allowing the wearable device to perform 9DOF position tracking as though it included a magnetometer even when the wearable device does not include a magnetometer.

According to this aspect, the motion tracking calibration data may include a yaw drift correction associated with the wearable device. The above features may have the technical effect of allowing the wearable device to correct for drift in yaw values when performing motion tracking calibration.

According to this aspect, the one or more processing devices may be further configured to determine, based at least in part on the imaging data, that the wearable device is outside a field of view of the imaging sensor. In response to determining that the wearable device is outside the field of view of the imaging sensor, the one or more processing devices may be further configured to transmit, to the wearable device, instructions to apply the yaw drift correction until a predetermined duration has elapsed. The above features may have the technical effect of allowing the wearable device to continue correcting for the yaw drift even when outside the field of view of the imaging sensor.

According to this aspect, the one or more processing devices may be further configured to offset the estimated position and orientation of the wearable device relative to the offboard computing device based at least in part on the computing device acceleration data and the computing device orientation data. The one or more processing devices may be further configured to compute the motion tracking calibration data based at least in part on the offset estimated position and orientation. The above features may have the technical effect of adjusting the motion tracking calibration data to account for movement of the offboard computing device.

According to this aspect, the one or more processing devices are configured to compute the estimated position and orientation at least in part at a trained machine learning model. The above features may have the technical effect of performing image recognition to accurately identify the position and orientation of the wearable device from the imaging data.

According to this aspect, the imaging sensor may be a camera or an ultra-wideband (UWB) sensor. The above features may have the technical effect of allowing the computing device to collect the imaging data of the wearable device.

According to another aspect of the present disclosure, a computing system is provided, including a wearable device. The wearable device includes an accelerometer configured to collect acceleration data, a gyroscope configured to collect orientation data, and a first processor. The computing system further includes an offboard computing device. The offboard computing device includes an imaging sensor configured to capture imaging data of a user wearing the wearable device, and further includes a second processor. The offboard computing device is configured to process the imaging data to generate simulated magnetometer data. The first processor and/or the second processor is configured to, based at least in part on the acceleration data, the orientation data, and the simulated magnetometer data, perform motion tracking calibration to obtain an estimated position and orientation of the wearable device relative to the offboard computing device. The above features may have the technical effect of increasing the accuracy of the motion tracking calibration.

According to this aspect, the first processor may be configured to receive the simulated magnetometer data from the offboard computing device. The first processor may be further configured to compute the estimated position and orientation at least in part by performing sensor fusion of the acceleration data, the orientation data, and the simulated magnetometer data. The above features may have the technical effect of allowing the wearable device to perform 9DOF position tracking as though it included a magnetometer even when the wearable device does not include a magnetometer.

According to this aspect, the second processor may be further configured to compute a yaw drift correction associated with the wearable device at least in part by computing the estimated position and orientation of the wearable device relative to the offboard computing device. Computing the yaw drift correction may further include receiving the acceleration data and the gyroscope data from the wearable device. The yaw drift correction may be computed based at least in part on the estimated position and orientation, the acceleration data, and the gyroscope data. The second processor may be further configured to transmit the yaw drift correction to the wearable device. The first processor may be further configured to apply the yaw drift correction to the estimated position and orientation. The above features may have the technical effect of allowing the wearable device to correct for drift in yaw values when performing motion tracking calibration.

According to this aspect, the offboard computing device may further include an offboard computing device accelerometer and an offboard computing device gyroscope. The second processor may be further configured to receive offboard computing device acceleration data from the offboard computing device accelerometer. The second processor may be further configured to receive offboard computing device orientation data from the offboard computing device gyroscope. The second processor may be further configured to offset the estimated position and orientation of the wearable device relative to the offboard computing device based at least in part on the offboard computing device acceleration data and the offboard computing device orientation data. The second processor may be further configured to compute the yaw drift correction based at least in part on the offset estimated position and orientation. The above features may have the technical effect of adjusting the motion tracking calibration data to account for movement of the offboard computing device.

"And/or" as used herein is defined as the inclusive or ∨, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A wearable device comprising:
an accelerometer;
a gyroscope; and
a processing device configured to:
    receive acceleration data from the accelerometer;
    receive orientation data from the gyroscope;
    receive simulated magnetometer data from an offboard computing device, wherein the simulated magnetometer data includes an estimated direction of the Earth's magnetic field at the wearable device;
    based at least in part on the acceleration data, the orientation data, and the simulated magnetometer data, perform motion tracking calibration to obtain an estimated position and orientation of the wearable device relative to the offboard computing device; and
    output the estimated position and orientation to an additional computing process.

2. The wearable device of claim 1, wherein:
the wearable device is a wearable audio device that includes one or more speakers; and
the processing device is further configured to:
    receive spatial audio generating instructions from the offboard computing device; and
    via the one or more speakers, output spatial audio as indicated by the spatial audio generating instructions, wherein the processing device is configured to localize the spatial audio based at least in part on the estimated position and orientation.

3. The wearable device of claim 1, wherein the processing device is further configured to perform nine-degree-of-freedom (9DOF) position tracking using the acceleration data, the orientation data, and the simulated magnetometer data to compute the estimated position and orientation.

4. The wearable device of claim 1, wherein the processing device is configured to perform the motion tracking calibration at least in part by:
    computing a yaw drift correction based at least in part on the simulated magnetometer data, the acceleration data, and the orientation data; and
    computing the estimated position and orientation based at least in part on the yaw drift correction.

5. The wearable device of claim 4, further comprising a temperature sensor, wherein the processing device is further configured to:
    receive a temperature value from the temperature sensor; and
    compute the yaw drift correction based at least in part on the temperature value.

6. The wearable device of claim 5, further comprising a memory device, wherein:
    the memory device stores a temperature lookup table mapping a plurality of temperature values to a respective plurality of yaw drift corrections;
    at a predetermined time interval, the processing device is further configured to at least partially recompute the temperature lookup table using calibration data received at least in part from the offboard computing device.

7. The wearable device of claim 1, further comprising a proximity sensor, wherein:
    via the proximity sensor, the processing device is further configured to receive an indication that the wearable device is not worn by a user;
    the acceleration data indicates that the wearable device is stationary; and
    the processing device is further configured to perform the motion tracking calibration in response to receiving the indications that the wearable device is stationary and not worn by the user.

8. The wearable device of claim 1, wherein the processing device is configured to perform the motion tracking calibration in response to receiving a calibration opportunity signal from the offboard computing device via a wireless connection.

9. The wearable device of claim 8, further comprising a memory device, wherein:
    the memory device is configured to store a sensor data buffer of one or more frames that each include respective values of the acceleration data, the orientation data, and the simulated magnetometer data at a corresponding timestep; and
    in response to receiving the calibration opportunity signal, the processing device is further configured to perform the motion tracking calibration based at least in part on the one or more frames stored in the sensor data buffer.

10. A method for use with a wearable device, the method comprising:
receiving acceleration data from an accelerometer;
receiving orientation data from a gyroscope;
receiving simulated magnetometer data from an offboard computing device, wherein the simulated magnetometer data includes an estimated direction of the Earth's magnetic field at the wearable device;
based at least in part on the acceleration data, the orientation data, and the simulated magnetometer data, performing motion tracking calibration to obtain an estimated position and orientation of the wearable device relative to the offboard computing device; and outputting the estimated position and orientation to an additional computing process.

11. The method of claim 10, wherein:
the wearable device is a wearable audio device that includes one or more speakers; and
the method further comprises:
receiving spatial audio generating instructions from the offboard computing device; and
via the one or more speakers, outputting spatial audio as indicated by the spatial audio generating instructions, wherein the spatial audio is localized based at least in part on the estimated position and orientation.

12. The method of claim 10, wherein performing the motion tracking calibration includes performing nine-degree-of-freedom (9DOF) position tracking based at least in part on the acceleration data, the orientation data, and the simulated magnetometer data.

13. The method of claim 10, wherein performing the motion tracking calibration includes:
computing a yaw drift correction based at least in part on the simulated magnetometer data, the acceleration data, and the orientation data; and
computing the estimated position and orientation based at least in part on the yaw drift correction.

14. The method of claim 13, further comprising:
receiving a temperature value from a temperature sensor; and
computing the yaw drift correction based at least in part on the temperature value.

15. A computing device comprising:
an imaging sensor;
an accelerometer;
a gyroscope;
a magnetometer; and
one or more processing devices configured to:
via the imaging sensor, receive imaging data of a wearable device;
via the accelerometer, receive computing device acceleration data;
via the gyroscope, receive computing device orientation data;
via the magnetometer, receive computing device magnetic field data, wherein the simulated magnetometer data includes an estimated direction of the Earth's magnetic field at the wearable device;
based at least in part on the imaging data, compute an estimated position and orientation of the wearable device relative to the imaging sensor;
based at least in part on the estimated position and orientation, the computing device acceleration data, the computing device orientation data, and the computing device magnetic field data, compute motion tracking calibration data associated with the wearable device; and
transmit the motion tracking calibration data to the wearable device.

16. The computing device of claim 15, wherein the motion tracking calibration data includes simulated magnetometer data associated with the wearable device.

17. The computing device of claim 15, wherein the motion tracking calibration data includes a yaw drift correction associated with the wearable device.

18. The computing device of claim 17, wherein the one or more processing devices are further configured to:
determine, based at least in part on the imaging data, that the wearable device is outside a field of view of the imaging sensor; and
in response to determining that the wearable device is outside the field of view of the imaging sensor, transmit, to the wearable device, instructions to apply the yaw drift correction until a predetermined duration has elapsed.

19. The computing device of claim 15, wherein the one or more processing devices are further configured to:
offset the estimated position and orientation of the wearable device relative to the offboard computing device based at least in part on the computing device acceleration data and the computing device orientation data; and
compute the motion tracking calibration data based at least in part on the offset estimated position and orientation.

20. The computing device of claim 15, wherein the one or more processing devices are configured to compute the estimated position and orientation at least in part at a trained machine learning model.

21. The computing device of claim 15, wherein the imaging sensor is a camera or an ultra-wideband (UWB) sensor.

22. A computing system, comprising:
a wearable device including an accelerometer configured to collect acceleration data, a gyroscope configured to collect orientation data, and a first processor; and
an offboard computing device including an imaging sensor configured to capture imaging data of a user wearing the wearable device, and further including a second processor, wherein:
the offboard computing device is configured to process the imaging data to generate simulated magnetometer data;
the simulated magnetometer data includes an estimated direction of the Earth's magnetic field at the wearable device; and
the first processor and/or the second processor is configured to, based at least in part on the acceleration data, the orientation data, and the simulated magnetometer data, perform motion tracking calibration to obtain an estimated position and orientation of the wearable device relative to the offboard computing device.

23. The computing system of claim 22, wherein the first processor is configured to:
receive the simulated magnetometer data from the offboard computing device; and
compute the estimated position and orientation at least in part by performing sensor fusion of the acceleration data, the orientation data, and the simulated magnetometer data.

24. The computing system of claim 22, wherein:
the second processor is further configured to:
compute a yaw drift correction associated with the wearable device at least in part by:
computing the estimated position and orientation of the wearable device relative to the offboard computing device;
receiving the acceleration data and the gyroscope data from the wearable device; and
computing the yaw drift correction based at least in part on the estimated position and orientation, the acceleration data, and the gyroscope data; and
transmit the yaw drift correction to the wearable device; and the first processor is further configured to apply the yaw drift correction to the estimated position and orientation.

25. The computing system of claim 24, wherein:

the offboard computing device further includes an offboard computing device accelerometer and an offboard computing device gyroscope; and the second processor is further configured to:
- receive offboard computing device acceleration data from the offboard computing device accelerometer;
- receive offboard computing device orientation data from the offboard computing device gyroscope;
- offset the estimated position and orientation of the wearable device relative to the offboard computing device based at least in part on the offboard computing device acceleration data and the offboard computing device orientation data; and
- compute the yaw drift correction based at least in part on the offset estimated position and orientation.

* * * * *